United States Patent Office
3,543,101
Patented Nov. 24, 1970

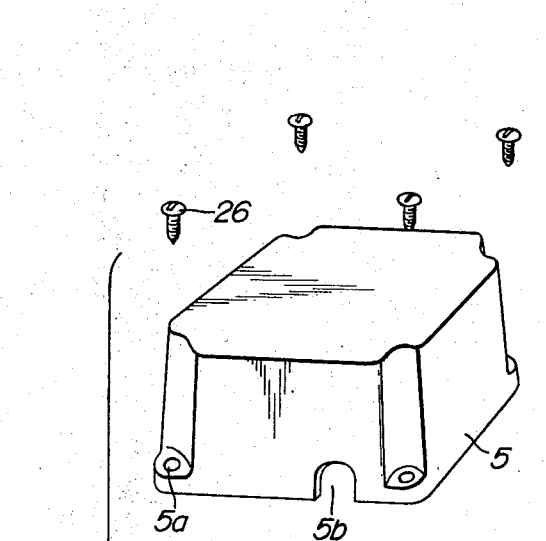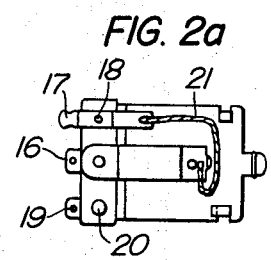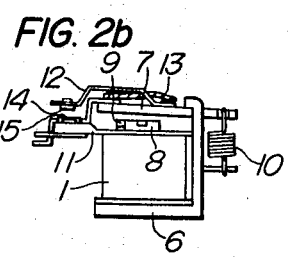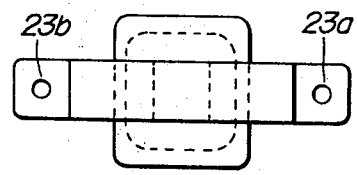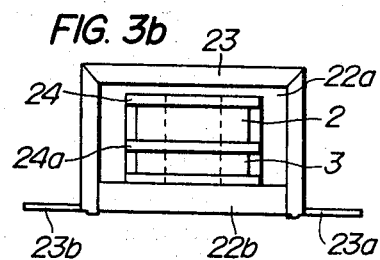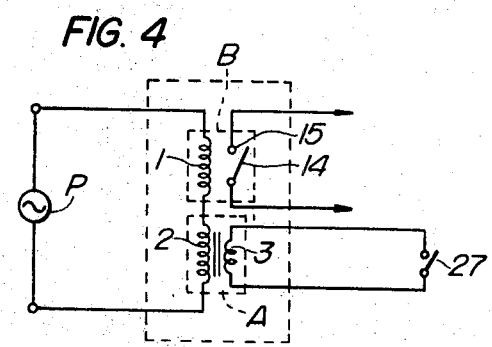

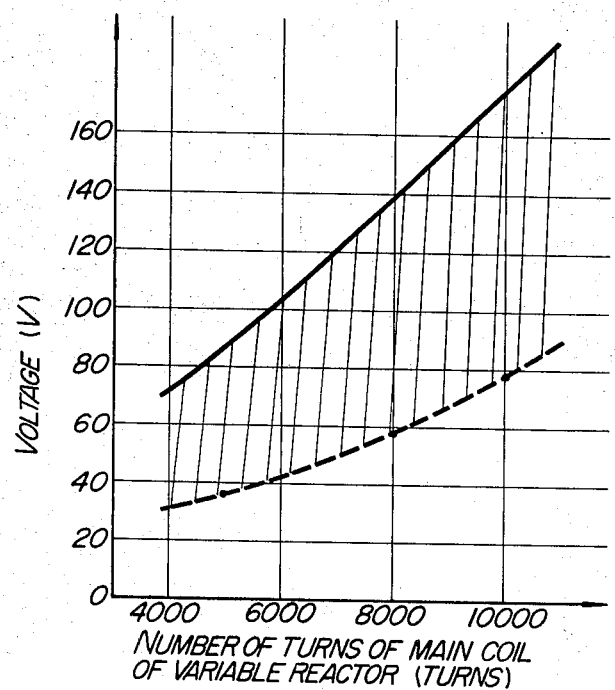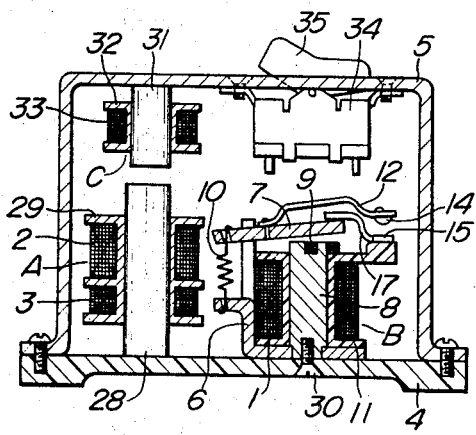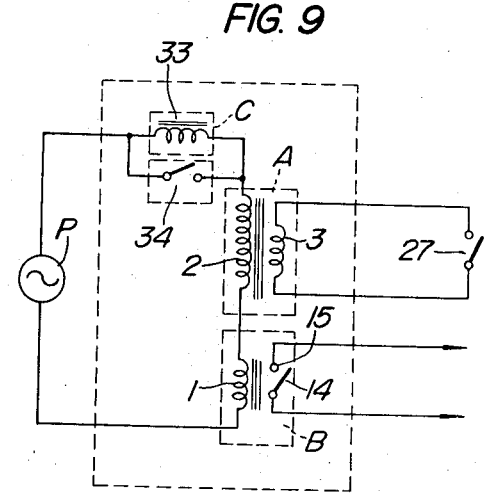

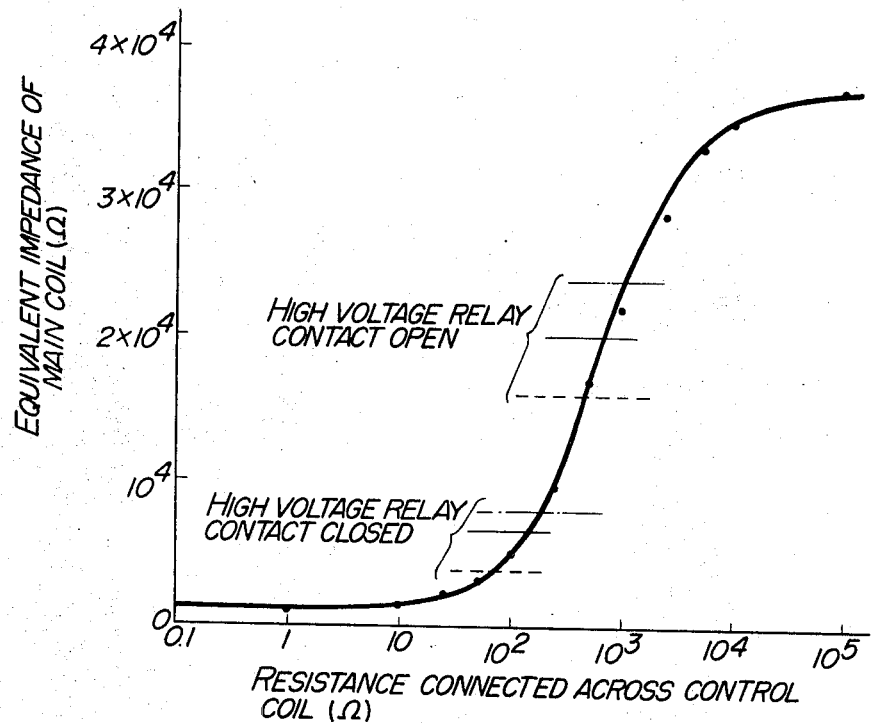
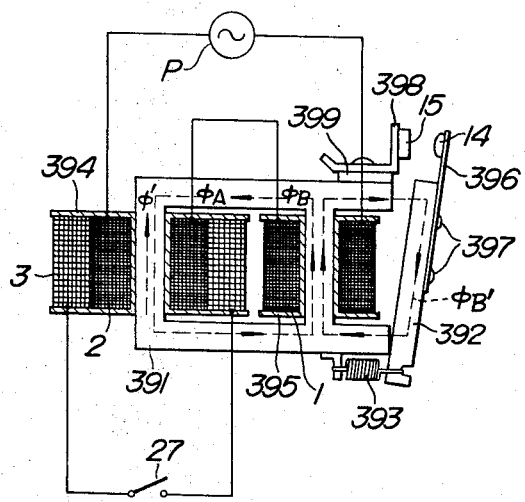
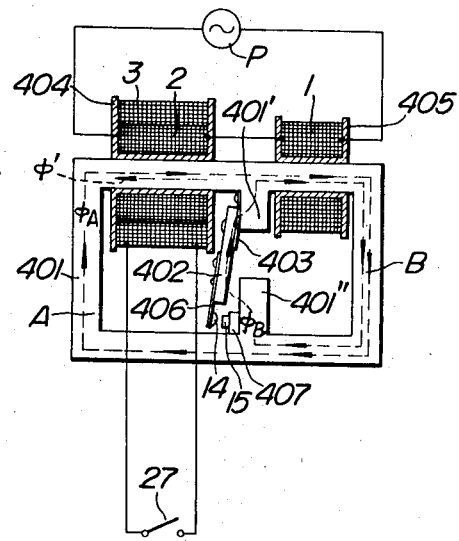

3,543,101
ALTERNATING CURRENT ELECTROMAGNETIC APPARATUS
Koichi Yoshimura and Yoshio Yamamoto, Kadoma-shi, Japan, assignors to Matsushita Electric Industrial Co., Ltd., Osaka, Japan, a corporation of Japan
Filed Jan. 12, 1968, Ser. No. 697,498
Claims priority, application Japan, Jan. 16, 1967, 42/3,555 (utility models), 42/4,717, 42/4,718, 42/4,719; Mar. 17, 1967, 42/17,571; May 12, 1967 (utility model), 42/40,168; June 12, 1967 (utility models), 42/50,939, 42/50,940, 42/50,941, 42/50,942, 42/50,943; June 13, 1967 (utility models), 42/51,297, 42/51,298, 42/51,299, 42/51,300, 42/51,301, 42/51,302
Int. Cl. H01k 47/00
U.S. Cl. 317—156
1 Claim

ABSTRACT OF THE DISCLOSURE

An alternating current electromagnetic apparatus which comprises a variable reactor having a high voltage main coil and a low voltage control coil wound in a magnetic circuit of low magnetic resistance, and an electromagnet having a high voltage exciting coil wound in a magnetic circuit of high magnetic resistance including an armature, said main coil and said exciting coil being connected in series with each other and with an alternating current power supply source, the impedance of said low voltage control coil being varied to thereby remote-control said armature.

BACKGROUND OF THE INVENTION

This invention relates to an alternating current electromagnetic apparatus in which the high voltage main circuit is remote-controlled by the low voltage control circuit, and more particularly to an alternating current electromagnetic apparatus which is safe in operation and used with electric instruments for domestic use such as an electric clearner in which the main circuit including the electric blower is controlled by the switch of the low voltage control circuit provided in the grip portion of the flexible hose, air-conditioning fan, electric fan, radio set and television set, or with wiring means such as a safety switch, relay chime, trans-buzzer and lumped wiring control or with automatic controller devices for controlling the liquid level, temperature, humidity, light and the like.

There has heretofore been known an electromagnetic apparatus in which, for example, a transformer and a low voltage relay are combined so as to permit the application in an electric cleaner, as disclosed in U.S. Pat. 2,958,894. In this apparatus a high voltage switch for changing over the circuit of high voltage electric blower and a low voltage exciting coil of the low voltage relay are connected with the secondary coil of the transformer for dropping the voltage through a low voltage switch, and the low voltage relay is driven by the switching of said low voltage switch to thereby close or open the high voltage switch so as to start or stop the electric blower. In the apparatus of the U.S. patent, however, the high voltage switch of the primary circuit and the low voltage exciting coil of the control circuit are provided closely adjacent to each other in the relay portion, and therefore, if any trouble occurs to short-circuit the control and main circuits, a high voltage tends to appear in the manually operated low voltage switch and cause the danger of electric shock to the user of the device. In order to prevent such accidents, it is required to provide a strong insulation between the contact portion of the high voltage switch and the low voltage exciting coil, which eventually leads to a larger size, and therefore higher cost, of the relay.

Also, in the alternating current electromagnetic apparatus of the described type, it is necessary to previously increase the induced electromotive force of the secondary winding of the transformer since the current is limited by the impedance of the low voltage exciting coil of the relay when the low voltage switch is closed, and as a result there is a limit in lowering the voltage to be applied to the low voltage switch.

Another problem is that when the low voltage switch is opened, no current passes through the low voltage exciting coil of the relay, which means the presence of such residual magnetism in the magnetic circuit as would lead to a maloperation in which the high voltage switch is maintained in the closed state.

Still another disadvantage existing in the apparatus of the described type is that because of the low voltage at which the relay is operated, it is necessary to design the relay so that the impedance is low, and this in turn leads to a larger size and greater cost of the relay.

The present invention eliminates these various drawbacks existing in the known apparatus and additionally provides other effects which could never be achieved heretofore.

SUMMARY OF THE INVENTION

It is an object of the present invention to provide an alternating current electromagnetic apparatus which comprises a magnetic circuit of low magnetic resistance, a magnetic circuit of high magnetic resistance including an armature, a main coil and a control coil wound in said magnetic circuit of low magnetic resistance, and an exciting coil wound in said magnetic circuit of high magnetic resistance, said main coil and said exciting coil being connected in series with an alternating current source, the operation of said armature being controlled in accordance with the variation in the impedance across said control winding.

It is another object of the present invention to provide an alternating current electromagnetic apparatus in which the induced electromotive force of the control winding can be made 24 v. or a lower voltage and which thereby is safe and free from the danger of electric shock.

It is still another object of the present invention to provide a relay fitted with a contact mechanism driven by an armature, and further to provide a low voltage safety relay in which even if the exciting coil and said contact mechanism are short-circuited by a high voltage applied to said contact mechanism, the separate location of the control coil of the control circuit prevents any high voltage from being applied to the control circuit, thus eliminating the danger of electric shock.

It is yet another object of the present invention to provide an alternating current electromagnetic apparatus which is constructed so that some voltage is always applied to the exciting coil in the magnetic circuit including the armature, whereby reliable operation is obtained without any maloperation due to residual magnetism.

It is still another object of the present invention to provide an alternating current electromagnetic apparatus which is compact in size and low in cost with the exciting winding connected with the high voltage main circuit.

It is a further object of the present invention to provide an alternating current electromagnetic apparatus in which there is inserted in the control coil such control element as a thermistor, posistor or like thermosensitive element or as CdS, PbS or other photosensitive resistance element, whereby the operation is automatically effected in accordance with a change of the environment for which the control element is set.

It is still a further object of the present invention to provide an alternating current electromagnetic apparatus in which control elements such as a reactor, rectifier or the like are inserted in series with the main coil and the exciting coil and short-circuiting switches capable of short-circuiting these control elements are provided to thereby change over the voltage in use as desired.

It is yet a further object of the present invention to provide an alternating current electromagnetic apparatus in which the main coil, exciting coil or control coil is provided with tap which is short-circuited or changed over to thereby alter over the voltage in use as desired.

It is still another object of the present invention to provide an alternating current electromagnetic apparatus in which the main coil, exciting coil or control coil is divided into a plurality of sections which can be changed over to alter over the voltage in use as desired.

It is still another object of the present invention to provide an alternating current electromagnetic apparatus in which a capacitor producing parallel resonance with the exciting coil is connected parallel therewith to provide a wide operating voltage range.

It is a still further object of the present invention to provide an alternating current electromagnetic apparatus in which a magnetic circuit of high magnetic resistance and a magnetic circuit of low magnetic resistance are arranged integrally with each other so as to make the apparatus compact in size and light in weight as well as wide in operating voltage range.

These and other objects and advantages of the present invention will be understood more clearly from the following description given by way of example.

BRIEF DESCRIPTION OF DRAWINGS

FIG. 1 is a perspective view of the alternating current electromagnetic apparatus with the cover removed.

FIG. 2a is a top plan view showing only the high voltage relay portion.

FIG. 2b is a side view showing the high voltage relay portion.

FIGS. 3a and 3b are a top plan view and a side view respectively of the variable reactor only.

FIG. 4 illustrates a block diagram of the electric circuit of the alternating current electromagnetic apparatus.

FIG. 7 is a graph showing the relation between the number of turns of the main coil of the variable reactor and the operating voltage range of the high voltage relay.

FIG. 8 is a vertical cross-sectional view of another example of an alternating current electromagnetic apparatus according to the present invention.

FIG. 9 shows a block diagram of the electric circuit thereof.

FIGS. 37, 39, 40 and 41 show schematic diagrams of the respective magnetic circuits in still further examples of the present invention.

FIG. 38 is a graph showing the relation between the resistance connected across the control coil and the equivalent impedance of the main coil in these examples.

DESCRIPTION OF THE PREFERRED EMBODIMENTS

Figure 5:
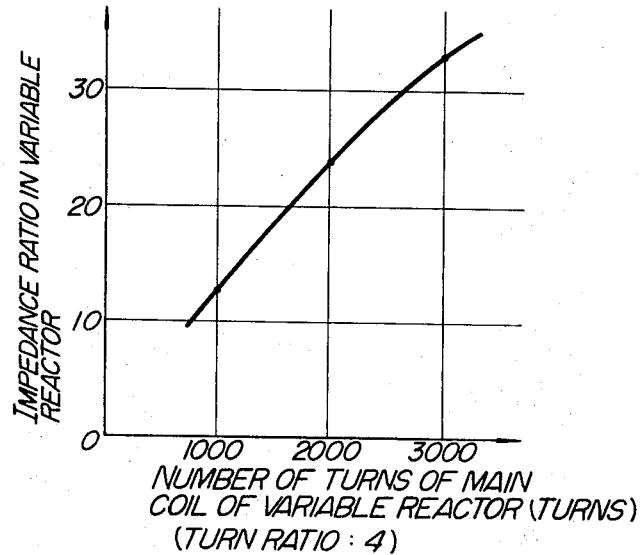
FIG. 5 is a graph showing the relation between the number of turns of the main coil of the variable reactor and the impedance ratio in the variable reactor.

In FIGS. 1 through 4 the numeral 1 represents the exciting coil of a high voltage relay B and numeral 2 denotes the main coil of a variable reactor A to which a high voltage is applied. The numeral 3 denotes the control coil of a variable reactor A to which a low voltage is applied. As shown in FIG. 4, the exciting coil 1 and the main coil 2 are connected in series with each other and they are also connected with a power source P. There is a base 4 of insulating material on which the high voltage relay B and the variable reactor A are mounted. A cover 5 is provided to protect the high voltage relay B and variable reactor A from dust.

Referring to FIG. 2, the high voltage relay B includes an L-shaped core 6 made of ferromagnetic material, an armature 7 also made of ferromagnetic material, and a fixed iron core 8 made of ferromagnetic material. Said core 6, armature 7 and fixed iron core 8 together form the magnetic circuit of high magnetic resistance in the high voltage relay. A shading coil 9 is provided to prevent the vibration of the armature 7 and increase the attraction. There is also provided an energizing spring 10 which attracts the armature 7 and opens a contact mechanism to be described when no current is passing through the exciting coil 1. A coil bobbin 11 of the exciting coil 1 is provided which has at one end thereof a terminal plate for the terminal contact of the exciting coil 1 as described later. A contact spring plate 12 has a movable contact 14 attached to one end thereof and is secured to the armature 7 at the other end thereof by means of a rivet 13. The contact spring 12 serves to apply a pressure to the movable contact 14 as well as to pass a current therethrough. A fixed contact 15 together with a terminal plate 16 is fixed to the coil bobbin 11 in opposed relationship with said movable contact 14. A stopper 17 is fixed to the coil bobbin 11 by means of a rivet 18, the stopper serving as a terminal of the exciting coil 1 and the terminal of a load and having its upper portion bent into L-shape so as to strike the armature so that a suitable clearance is selected between the armature 7 and the fixed iron core 8. The numeral 19 denotes the other terminal of the exciting coil 1 that is fixed to the coil bobbin 11 by means of a rivet 20, and the numeral 21 a soft coil which electrically connects the contact spring plate 12 with the terminal 17.

The operation of the high voltage relay B is such that, when there is a current passing through the exciting coil 1, the armature 7 is attracted to the fixed iron core 8 against the force of the energizing spring 10 whereby the movable contact 14 is engaged with the fixed contact 15, but that in the absence of the current the armature 7 is retracted by the energizing spring 10 so as to disengage the two contacts 14 and 15 from each other.

Referring to FIG. 3, the variable reactor includes a high voltage main coil 2 and a low voltage control coil 3, both of which are wound on a coil bobbin 24 and separated by an intermediate plate 24a to form an upper portion and a lower portion respectively. The variable reactor also has an E-shaped fixed iron core 22a and an I-shaped fixed iron core 22b, and by the combination of these two iron cores, a magnetic circuit of low magnetic resistance is completely closed in the variable reactor. Said two cores 22a and 22b are fastened by a frame 23 which has mounting portions 23a provided with mounting apertures 23b.

The above-described high voltage relay and variable reactor are mounted on the base 4 by means of screws 25 and 25a as shown in FIG. 1, and the base 4 is covered by the cover 5 which is mounted on the base by means of screws 26 passing through the mounting apertures 5a of the cover and the mounting apertures 4a of the base aligned therewith. An opening 5b formed in the cover 5 is intended to let out a wire lead and the like therethrough.

The operation of the apparatus according to the present invention will now be described. The variable reactor comprises a high voltage main coil 2 and a low voltage control coil 3, the latter coil having a terminal connected with a switch 27 disposed at a remote place or the like so as to permit short-circuiting and opening. Now, in the case where the control coil 3 is opened, the impedance of the variable reactor consists of a reactance component which is proportional to the square of the number of turns and a resistance component which is proportional to approximately 1.1 power of the number of turns. However, if the magnetic resistance of the iron core is low, the impedance is determined substantially only by the reactance. The value thus determined corresponds to the exciting impedance and is a very great value. Next, in the case where the terminal of the control coil is short-circuited, a short-circuiting current flows in the secondary side to negate the reactance component so that the impedance of the variable reactor consists substantially of a resistance component alone. The value of the impedance equals the sum of the main coil resistance and (turn ratio)$^2 \times$ control coil resistance, and it is reduced to one-tenth or less of that when the control coil 3 is opened.

FIG. 5 illustrates, in the case where the turn ratio of the variable reactor is fixed at 4, how much greater the impedance of the reactor will become by short-circuiting and opening of the control coil 3 when the number of turns of the main coil 2 is increased. It is seen from this figure that the greater the number of turns of the main coil 2, the greater variation in impedance is obtained. This is because the increase in the reactance when the control coil 3 is opened is effected at the rate of a squared number of turns.

Figure 6:
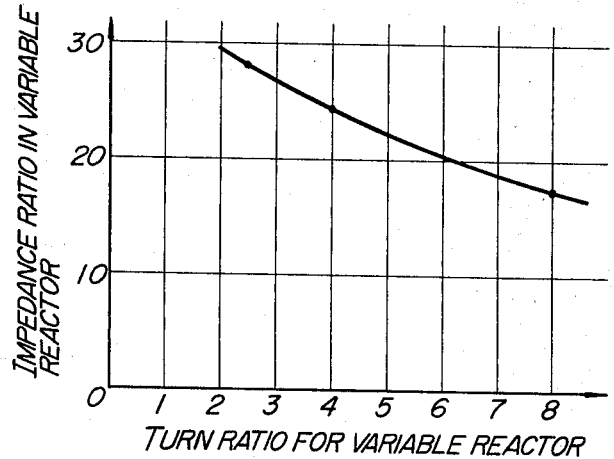
FIG. 6 is a graph showing the relation between the number of turns ratio of the variable reactor and the impedance ratio.

FIG. 6 shows how the impedance of the reactor will be varied with respect to the turn ratio of coil 2 to coil 3 (but with the number of turns of the main coil 2 being constant). As will be seen, the nearer to 1 the turn ratio is, the greater variation is obtained. This is because the resistance component is reduced when the control coil 3 is short-circuited.

The variation in the impedance of the variable reactor will be shown by way of example as follows:

|  | Number of turns | Resistance ($\Omega$) |
| --- | --- | --- |
| Primary coil | 9,000 | 2,217 |
| Control coil | 850 | 48.94 |

In this case, the variation was at the ratio of about 15:1 as shown below.

Control coil opened—110,000$\Omega$

Control coil short-circuited—7,400$\Omega$

In this way, the main coil of the variable reactor of which the impedance is quickly varied and the exciting coil of the high voltage relay are connected together, and therefore, if the voltage to be applied is constant in FIG. 4, the voltage applied to each of the high voltage relay and the variable reactor will be quickly varied by opening or closing of the control coil of the variable reactor. In other words, when the control coil is opened, the variable reactor has substantially all the voltage applied thereto, but when the control coil is short-circuited, the impedance of the variable reactor is reduced and a degree of voltage is also applied to the high voltage relay. An actual example of this will be shown below:

| Applied Voltage, 100 v. | Control coil opened, voltage | Control coil short circuited, voltage |
| --- | --- | --- |
| Voltage of variable reactor | 98.6 | 63.3 |
| Voltage of high voltage relay | 2.3 | 39.6 |

Thus, if a voltage in the vicinity of 25 v. is used as the voltage for initiating the operation of the high voltage relay, the relay will vary the impedance of the control coil 3 by the opening or closing of the switch 27 of the variable reactor control coil 3 so as to operate the armature 7, whereby the high voltage switch comprising the contacts 14, 15 and so on of the contact mechanism can be remote-controlled.

The foregoing description explains the basic operation of the present invention. In practice, however, there are various limitations, and therefore it is desirable to select the best aspect for the purpose and determine the particulars of each part. In FIG. 7 there is shown the relation between the number of turns of the main coil 2 in the variable reactor and the voltage range in which the high voltage relay effects its normal operation, and such operating voltage range is represented by the hatched portion therein.

In the above-shown example, the number of turns of the control coil 3 is selected such that the maximum control voltage of the control coil is 24 v. or lower. This may also hold true with the main coil 2 and the exciting coil 1. Also, in the foregoing example, a switch 10 is interposed across the terminals of the control coil 3, while it is also possible to replace such switch by a variable resistance element such as photosensitive, thermosensitive, humidity-sensitive, or magnetic resistance element and control the high voltage relay in accordance with the physical quantity obtained by such element.

The alternating current electromagnetic apparatus described above has the following various effects.

First, the high voltage relay can be controlled by a low voltage, which results in the prevention of electric shocks.

Second, the use of a high voltage wire lead as the remote-control wire tends to cause the leak which leads to a maloperation, whereas in the present invention the use of a low voltage ensures the absence of such leak.

Third, the high voltage switch referred to as the contact mechanism is located on the high voltage side, and this leads to extremely low possibility of the high voltage entering the low voltage side. Thus, both the exciting coil and the contact mechanism in the high voltage relay are maintained at a high voltage, resulting in a very simple construction of the relay without the necessity of using any insulation.

Additionally, it is possible to provide a very low voltage simply by varying the impedance of the variable reactor. Furthermore, only the variable reactor portion forms the low voltage side which requires a high dielectric strength, and therefore insulation can be readily provided in the apparatus.

Still furthermore, the high voltage relay always has some current flowing therethrough which provides a magnetovotive force to prevent the maloperation due to the residual magnetism. Consequently, the necessity of providing a demagnetizing ring or demagnetizing coil is eliminated not only to reduce the cost of manufacture, but also to increase the performance because there is no loss of energy which may arise from such demagnetizing means.

FIGS. 8 through 13 illustrate another example of the present invention in which the alternating current electromagnetic apparatus as shown in FIGS. 1 through 7 has in addition means for changing over the rated voltage available for said apparatus by simple operation. The basic operation of the alternating current electromagnetic apparatus according to this example is similar to that of the apparatus described above with reference to FIGS. 1 through 7, and therefore like parts are represented by like numerals and description will be made only of the differences between the two examples.

In FIG. 8, the numeral 28 denotes a fixed iron core of the variable reactor fixed to a base 4. The fixed iron core 28 has a coil bobbin 29 mounted thereon, said coil bobbin has a main coil 2 and a control coil 3 wound on the upper and lower portions thereof respectively. The high voltage relay mounted on the base 4 by means of screws 30 in the right-hand side of the variable reactor, as viewed in FIG. 8, is identical with that shown in FIGS. 1 to 7, and no description thereof will be necessary. The numeral 31 indicates an iron core of the fixed reactor mounted on the inner surface of a cover 5, and this iron core 31 is excited by a coil 33 wound on a coil bobbin 32. The cover 5 also has a switch 34 mounted on the inner surface thereof, said switch being adapted to short-circuit or open the coil 33 by means of operating button 35 exposed externally of the cover 5.

FIG. 9 shows the electric connection of this example, which differs from the previously described one in that the coil 33 of the fixed reactor C, the main coil 2 of the variable reactor and the exciting coil 1 of the high voltage relay B are connected in series with the alternating current source P, and that the switch 34 is connected between the terminals of the coil 33.

Description will now be made of the operation when the rated voltage used in this appartus is changed over as desired.

The use of the switch 34 is such that when the switch is closed to short-circuit the coil 33 a low voltage is in use, and that when the switch is opened to open the coil 33 the high supply voltage is in use.

Figure 10:
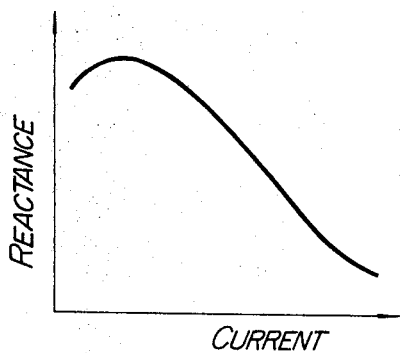
FIG. 10 is a graph illustrating the relation between the current passing through the coil of the reactor and the reactance.

Usually the impedance of a reactor having an iron core provided therein is such that the reactance component is greater under the non-saturated condition and decreases as the saturated condition is approached, while the resistance increases on the other hand and it becomes the only component when complete saturation is reached. Such relation also holds true with the current flowing through the reactor, and in fact, as shown in FIG. 10, the reactance component decreases as the current increases.

The current flowing through the variable reactor and the high voltage relay is very small when the control coil 3 of the variable reactor is opened, and thus it may be said that the circuit is determined substantially by the reactance.

Accordingnly, if a fixed reactor C is inserted as shown in FIG. 9 so as to increase the rated voltage in this case, it is still necessary that the reactance be higher and the resistance component be lower. When the control coil 3 of the variable reactor A is short-circuited, the variable reactor A and the high voltage relay B will have substantially only the resistance component, and therefore it is desirable that at this time the fixed reactor C also becomes the resistance component.

In other words, it is preferable that the impedance of the fixed reactor C be also such that it has a great value determined by the reactance component when the control coil 3 of the variable reactor A is opened, but that the reactance component approaches saturation and sharply decreases when the control coil 3 is short-circuited. In this respect, the reactor provided with an iron core, as described previously, has a convenient characteristic in that the reactance component in it decreases as the current increases, and therefore such reactor is the most suitable. In short, it is essential to select the cross-sectional area of the iron core such that it is magnetically saturated when the control coil 3 is short-circuited.

The coil 33 may be provided with a number of taps, which can be used for a number of rated voltages by changing over their connection through the use of a switch. Also, by the addition of means for successively varying the impedance instead of providing a switch 34, it is possible to successively vary the rated voltage.

Figure 11:
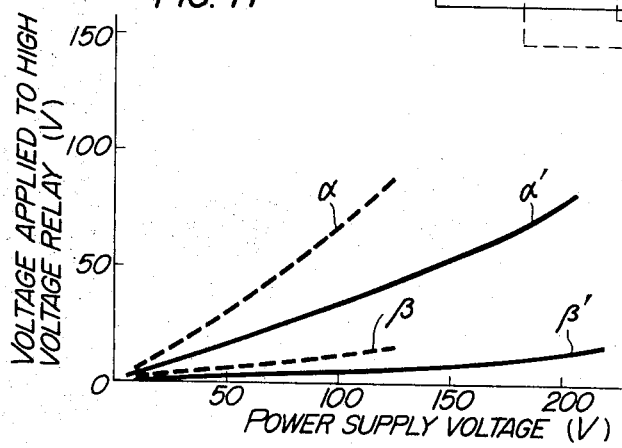
FIG. 11 is a graph showing the voltage applied to the high voltage relay upon short-circuiting and opening of the fixed reactor.

FIG. 11 illustrates the variation in the voltage applied to the high voltage relay by short-circuiting and opening the fixed reactor C. The dotted curve α represents the case where the coil 33 of the fixed reactor C is short-circuited across the terminals thereof and the control coil is closed. The solid curve α' represents the case where the coil 33 is opened across the terminals thereof and the control coil 3 is closed. The doted curve β represents the characteristic when the coil 33 is short-circuited with the control coil 3 being open, while the solid curve β' represents the characteristic when the coil 33 is opened.

As seen from the foregoing, it is possible to change over the rated voltage by simple means, which eliminates the rated voltage by simple means, which eliminates the necessity of replacing the electromagnetic apparatus for each of the different voltages used.

Figure 12:
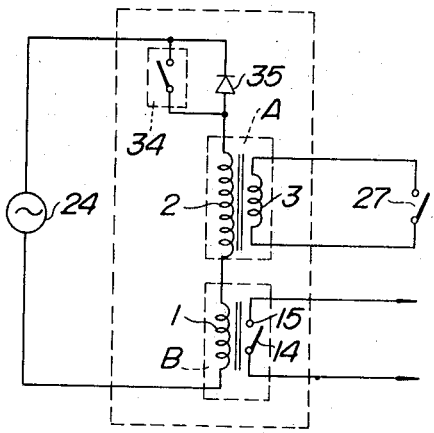
FIG. 12 is a block diagram illustrating the electric circuit in still another example of an alternating current electromagnetic apparatus according to the present invention.
Figure 13:
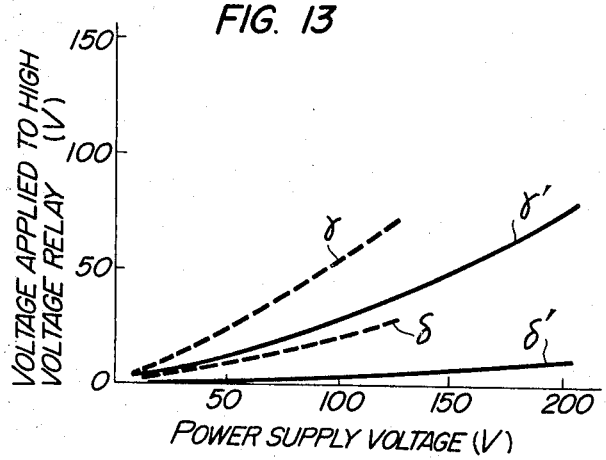
FIG. 13 is a graph illustrating the operation thereof.

FIGS. 12 and 13 show another example of means for changing over the rated voltage which can be used with the alternating current electromagnetic apparatus. This example is different from the electric connection shown in FIG. 9 in that use is made of a rectifier 35 instead of the fixed reactor C. When the rectifier 35 is short-circuited by the switch 34 connected across the terminals thereof, operation is assumed at a certain voltage. When the switch 34 is opened to turn on the rectifier 35 so as to effect half-wave rectification, the reactance component of the variable reactor A is greatly reduced even if the control coil 3 thereof is opened, and at the same time the reactance component of the high voltage relay B is also greatly reduced. Therefore, the current increases when the rectifier 35 is turned on, and the high voltage relay B operates at a lower voltage than that when the rectifier 35 is not turned on.

As a result of experiments, the composite impedance of the variable reactor A and the high voltage relay B varies as shown in the following table.

| | Without rectifier 35, KΩ | With rectifier 35, KΩ |
|---|---|---|
| Control coil 3: | | |
| opened | 120 | 27 |
| short circuited | 12 | 12 |

Consequently, the operating voltage of the high voltage relay B varies as follows:

In the case where the rectifier 35 is not provided:
The voltage at which the control coil 3 is short-circuited and the high voltage relay B attracts the armature is 130 v.
The voltage at which the control coil 3 is opened and the high voltage relay makes noise is 320 v.

In the case where the rectifier 35 is provided:
The voltage at which the control coil 3 is short-circuited and the high voltage relay attracts the armature is 80 v.
The voltage at which the control coil 3 is opened and the high voltage relay makes noise is 150 v.

In other words, if no use is made of the rectifier 35, 200 v. can be used as the rated voltage, while if use is made of the rectifier 35, 100 v. can be used as the rated voltage. Such condition is as shown in FIG. 13. The dotted curves α and δ show the characteristics when the rectifier 35 is turned on in the circuit, and the solid curves α' and δ' represent the characteristics when the rectifier 35 is short-circuited. Also, the dotted curve α and the solid curve α' refer to the case where the control coil 3 is closed, and the dotted curve δ and δ' represent the case where the control coil 3 is opened.

If the rectifier 35 is short-circuited across its terminals by the switch 34 through a resistance of a certain value, the operating voltage can be varied, for example, in the following way.

| | Voltage at which the control coil is short circuited and the high voltage relay attracts v. | Voltage at which the control coil is opened and the high voltage relay makes noise v. |
|---|---|---|
| When the rectifier 35 is short circuited through 100KΩ resistance. | 85 | 200 |
| When the rectifier 35 is short circuited through 50 KΩ resistance. | 100 | 250 |

In this way use is made of a rectifier as the means for changing over the rated voltage of the electromagnetic apparatus, and this provides such apparatus which is light in weight, compact in size and low in cost of manufacture.

FIGS. 14 through 23 show three other examples in which the alternating current electromagnetic apparatus of FIGS. 1 to 7 has in addition means for changing over the rated voltage available for that apparatus. The basic operation of this example as alternating current electromagnetic apparatus is identical with that described in conjunction with FIGS. 1 to 17, and like parts are indicated by like numerals. Description will be made only of the differences between this example and the first example.

Figure 14:
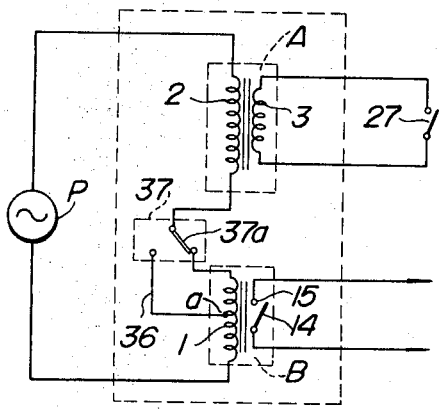
FIG. 14 is a block diagram of the electric circuit in a further example of an alternating current electromagnetic apparatus according to the present invention.

Referring to FIG. 14, a tap 36 is is led out of the exciting coil 1 of the high voltage relay B, and the tap 36 and one of the terminals of the exciting coil 1 are changeably connected together by a movable member 37a of a switch 37 having one of its terminals connected with the main coil 2 of the variable reactor A.

Figure 15:
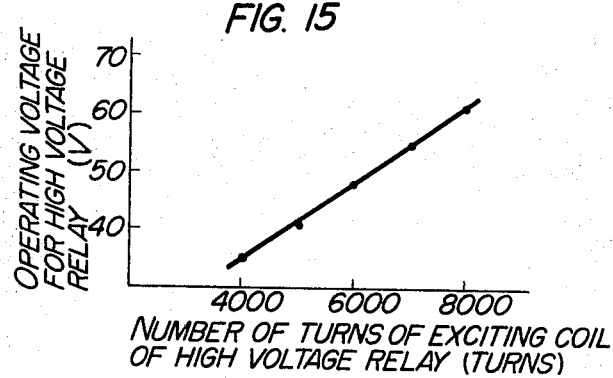
FIG. 15 is a graph showing the relation between the operating voltage of the high voltage relay and the number of turns of the exciting coil in the apparatus of FIG. 14.

In the shown arrangement, the voltage at which the high voltage relay B operates varies with respect to the number of turns of the exciting coil 1 as shown in FIG. 15, and therefore provision is made of the tap 36 for the exciting coil 1 so that the tap 36 can be changed over by the switch 37.

Since the high voltage relay B operates at a higher voltage as the number of turns is increased, the changing over of the movable member 37a of the switch 37 from the position as shown in FIG. 14 to the tap 36 will cause the relay to be operated at a low voltage.

Figure 16:
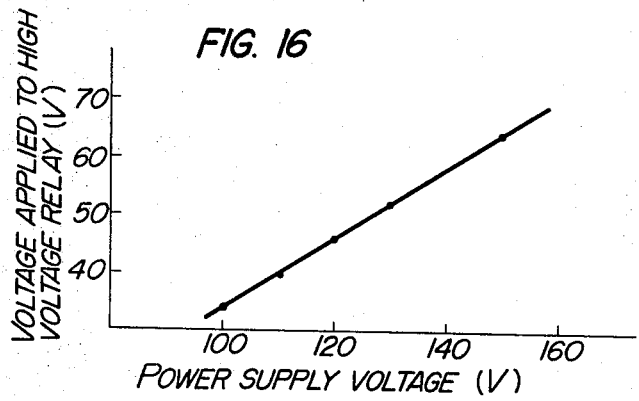
FIG. 16 is a graph illustrating the voltage applied to the high voltage relay when the control coil of the variable reactor in said apparatus is short-circuited.

The voltage applied to the high voltage relay B when the control coil 3 of the variable reactor is short-circuited has a relation as represented in FIG. 16, and therefore, if the number of turns of the exciting coil 1 is changed to 4000 and 8000, the operating voltage of the high voltage relay B is varied to 35 v. and 61 v. respectively. Thus the overall voltage is changed to 102 v. and 146 v. respectively.

In this way, the operating voltage of the high voltage relay B can be changed by changing the number of turns of the exciting coil 1 thereof, and consequently the rated voltage in use can be changed over.

Of course, it is also possible to change over a number of rated voltages by providing a number of taps from the exciting coil 1.

As described above, the tap is provided for the exciting coil of the high voltage relay in such a manner that the tap can be changed over, and therefore this arrangement can provide a more finely divided range in which the rated voltage is changed over than that arrangement in which the tap is provided for the variable reactor so as to be changed over. This in turn means a stable performance of the apparatus.

Moreover, it is easier to lead the tap out of the high voltage relay than to lead the tap out of the variable reactor which accommodates the terminals of the main and control coils. In addition, the portion for changing over the rated voltage is spaced apart from the control coil of the variable reactor, resulting in greater ease for insulation.

Still furthermore, this arrangement permits the apparatus to be small in size and light in weight, and also eliminates any local temperature rise because there is no coil portion that is short-circuited.

Figure 17:
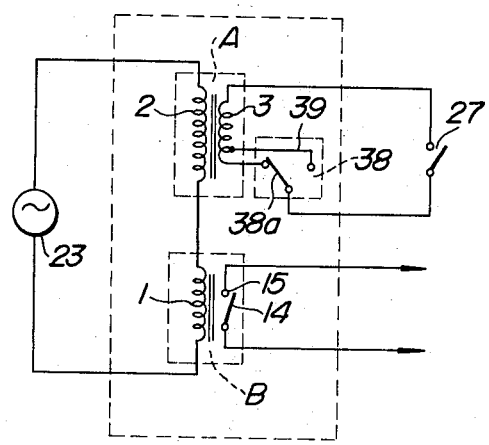
FIG. 17 shows a block diagram of the electric circuit in still another example of an alternating current electromagnetic apparatus according to the present invention.

In the example as shown in FIG. 17, when the movable member 38a of the switch 38 is in the position as shown or in the state that it is connected with one end of the control coil 3 of the variable reactor A, the rated voltage which can be used is a low one, and when the movable member is in the state that it is connected with the tap 39 led out from the intermediate of the control coil 3, the rated voltage which can be used is a high one.

When the control coil 3 of the variable reactor A is short-circuited, the impedance of the reactor consists substantially of the resistance component, the value of which is generally known to be (primary resistance)+(turn ratio)$^2$×(secondary resistance).

Figure 18:
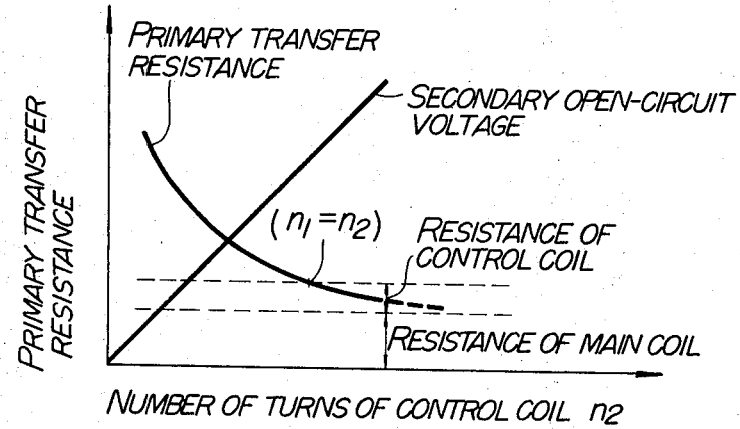
FIG. 18 is a graph showing the variation in primary transfer resistance with respect to the number of turns of the control coil of the variable reactor in the apparatus of FIG. 17.

Consequently, the primary transfer resistance varies with respect to the number of turns. This is shown in FIG. 18. Since the voltage at which the high voltage relay B is constant, if the resistance of the variable reactor A is increased, the high voltage relay B would not operate unless the overall voltage to be applied is increased by the same degree.

In other words, the voltage in use can be varied with respect to the variation in the resistance of the variable reactor A.

Figure 19:
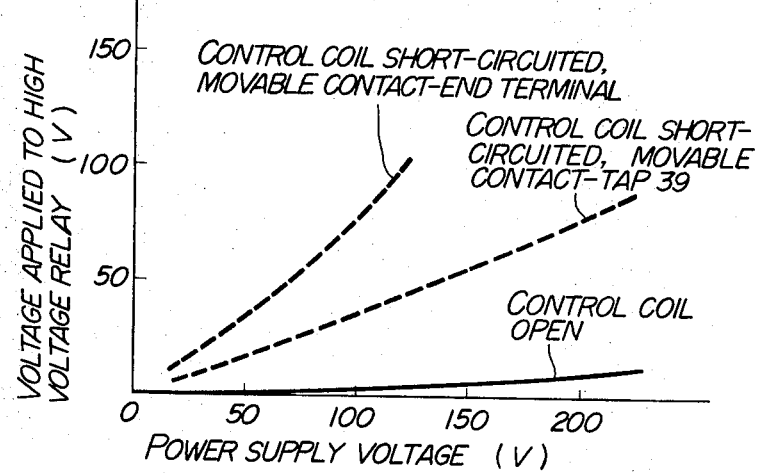
FIG. 19 is a graph showing the voltage applied to the high voltage relay upon short-circuiting and opening of the control coil of the variable reactor in the same apparatus.

FIG. 19 illustrates how the voltage applied to the high voltage relay B is varied. It is seen that when the control coil 3 of the variable reactor A is opened by the switch 27, only a low voltage is applied to the high voltage relay irrespective of the tap 39 of the control coil 3. If the control coil 3 is short-circuited by the switch 27, a high voltage is applied to the high voltage relay B because the coil which has a greater number of turns $N_2$ has a less reduced resistance to the primary side.

In the example just described, there is only one tap 39 of the control coil 3, but it is possible to increase the number of taps so as to permit a number of voltages to be used.

As means for changing over the voltage in use, the taps of the control coil of the variable reactor A are changed over in the described manner, and this eliminates the danger of electric shocks. Moreover, the tap change-over means in use may be one for a low voltage. Also, the control coil 3 is generally made of a thick wire which is easy to lead out and free from any trouble such as breakage or short-circuiting, and has a good yield.

FIGS. 20 through 23 show an example in which the rated voltage available for the electromagnetic apparatus is changed over by leading the tap out of the main coil 2 of the variable reactor A and changing over the tap.

Figure 20:
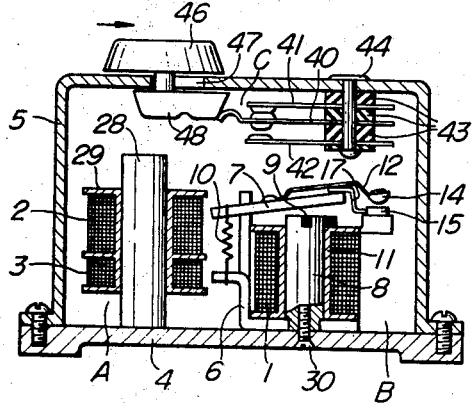
FIG. 20 is a vertical cross-sectional view of still another example of an alternating current electromagnetic apparatus according to the present invention.

In FIG. 20, the variable reactor A and the high voltage relay B are of the same construction as those shown in FIG. 8, and therefore like parts are indicated by like numerals. Description will be made only of the construction of the rated voltage change-over means C.

Referring to FIG. 20, the numerals 40, 41, and 42 represent contact plates mounted on the inner surface of the cover 5 by a pin 44 with an insulating material interposed therebetween. The movable contact plate 40 is connected with a terminal of the exciting coil 1, the fixed contact plate 41 is connected with a terminal of the main coil 2, and the fixed contact plate 42 is connected with an intermediate tap 45. The numeral 46 denotes an operating button projected into the cover 5 through a sliding guide slot 47 formed in the cover, and said operating button 46 has an operating portion 48 contacted by the movable contact plate 40. If the button 46 is displaced along the sliding guide slot 47 in the direction shown by the arrow in FIG. 20, the movable contact plate 40 which is always in contact with the fixed contact plate 41 is forced by the operating portion 48 of the button 46 to be disengaged from the fixed contact plate 41 and engaged with the other fixed contact plate 42.

Subsequently, after said movement, when the particulars of the iron core and coils of the alternating current electromagnetic apparatus are determined, the voltage at which the high voltage relay B operates, and the voltage at which the high voltage relay B starts to make noise with the control coil 3 of the variable reactor A being in the opened state but with its voltage being raised, are determined at certain levels respectively (if the control coil 3 is not short-circuited but the voltage thereof is raised, the impedance of the variable reactor A is decreased by saturation and the voltage applied to the high voltage relay B is raised, so that the high voltage relay B increases its force to attract and eventually make noise).

Figure 22:
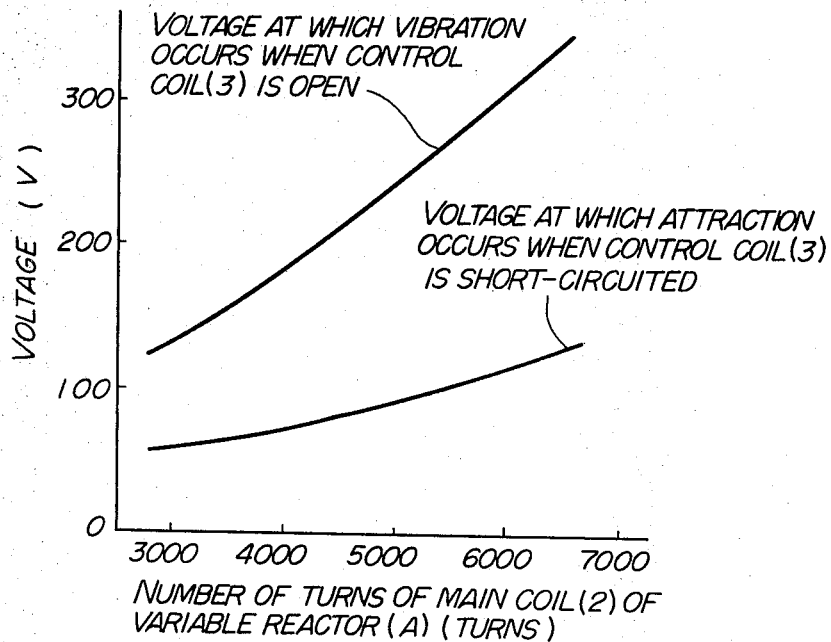
FIG. 22 is a graph showing the relation between the number of turns of the main winding of the variable reactor and the operation of the high voltage relay in the apparatus of FIG. 20.

The manner in which this is effected is shown in FIG. 22, wherein the number of turns of the control coil 3 was constant. However, the most appropriate number of turns of the main coil 2 may be about 3,800 for 100 v. and about 6,400 for 200 v. Therefore, if the tap 45 is led out of the intermediate point of the main coil 2 so that the fixed contact plates 41, 42 can be changed over by the movable contact plate 40, or the operating button 46 is in the position as shown by the solid line in FIG. 20, the fixed contact plate 41 and the movable contact plate 40 are brought into contact with each other. This is the case for 200 v. If the operating button is displaced in the direction of the arrow in FIG. 20, the two contact plates 42 and 40 are brought into engagement with each other, and this is the case for 100 v. Thus, this arrangement can be used with the rated voltages of two types of alternating current sources P.

Such change-over is to be indicated on the cover 5 or on the electric instruments with which the present invention is used.

Figure 23:
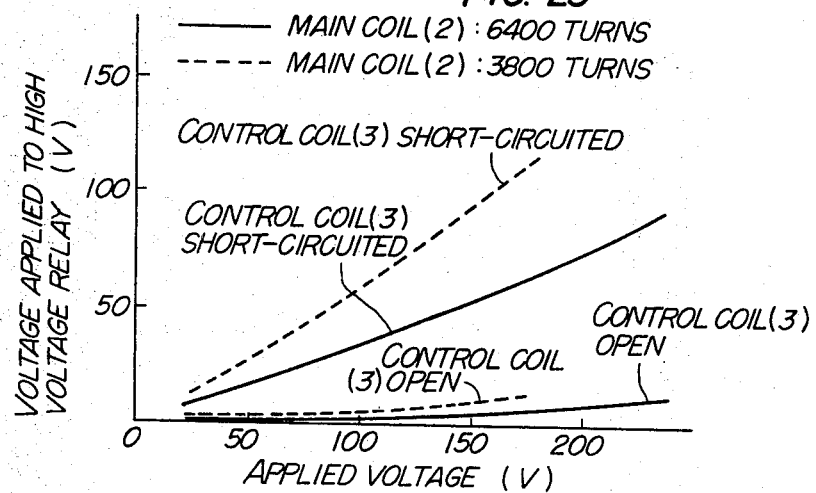
FIG. 23 is a graph showing the variation in the voltage applied to the high voltage relay with respect to the variation in the number of turns of the main winding of the variable reactor.

FIG. 23 shows the manner in which the voltage applied to the high voltage relay B is varied with respect to the variation in the impedance of the variable reactor A. It will be readily appreciated that when the control coil 3 of the variable reactor A is opened, the voltage applied to the high voltage relay B is low and that if the control coil 3 is short-circuited, the voltage applied to the high voltage relay B becomes quickly higher.

In this case, if the tap 45 is led out of the main coil 2, the voltage applied to the high voltage relay B is higher for the same supply voltage. In other words, if the tap is led out, lower rated voltages can be used.

In changing over the rated voltage, a high turn ratio of the variable reactor A is selected for a high rated voltage, and a low turn ratio of the variable reactor A is selected for a low rated voltage. Therefore, the voltage induced in the control coil 3 is substantially constant, and can be 24 v. or lower.

The result of experiments shows the induced voltage of the control coil 3 as follows:

| Number of turns of main coil 2: | Number of turns of control coil | Supply voltage (v.) | Induced voltage (v.) |
| --- | --- | --- | --- |
| 6,400 | 600 | 220 | 19.5 |
| 3,800 | 600 | 110 | 16.8 |

In any case the induced voltage is less than 24 v. as shown above, and if the used of the apparatus should touch the wire lead from the control coil 3 by mistake, there is no possibility of electric shock.

Figure 21:
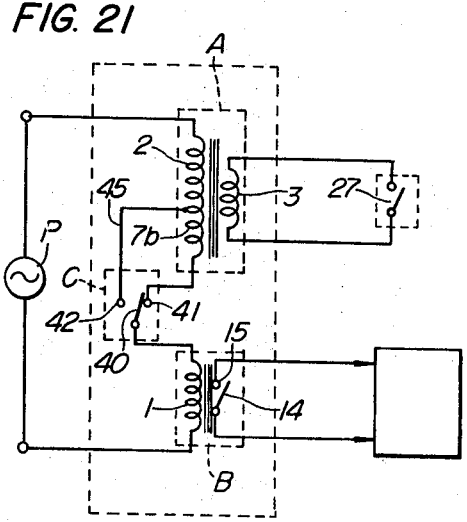
FIG. 21 is a block diagram of the electric circuit therein.

Although only one tap 45 is led out of the main coil in FIG. 21, a plurality of taps may be provided.

FIGS. 24 through 28 illustrate three modified forms in which the alternating current electromagnetic apparatus shown in FIGS. 1 to 7 is additionally provided with means for changing over the rated voltage available for the apparatus. The basic operation of the alternating current electromagnetic apparatus according to this example is identical with that described with respect to FIGS. 1 to 7, and therefore like parts are designated by like numerals. Only the differences therebetween will now be described.

Figure 24:
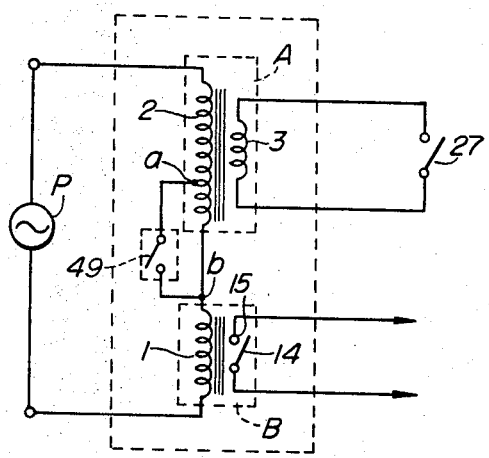
FIG. 24 is a block diagram of the electric circuit in a further example of an alternating current electromagnetic apparatus according to the present invention.

In the example as shown in FIG. 24, there is provided a tap $a$ in the main coil 2 of the variable reactor A, and between the tap $a$ and point $b$ there is connected a switch 49 to short-circuit or open a portion of the main coil 2 of the reactor A so as to change over the rated voltage to a low or a high voltage.

Now assuming that, in the circuit of FIG. 24, the number of turns in the portion of the main coil 2 that is not short-circuited is $n_1$, the resistance thereof is $r_1$, the number of turns in the portion of the main coil 2 that is short-circuited is $n_2$, the resistance thereof is $r_2$, the number of turns of the control coil 3 is $n_3$, and the resistance thereof is $r_3$, then the impedance of the reactor A is as follows:

When the primary coil 2 is not short-circuited, the reactance component L during the opening of the control coil 3 is:

$$L = k(n_1 + n_2)^2$$

where $k$ is a constant. The resistance component R is:

$$R = r_1 + r_2$$

∴ The impedance Z becomes as follows:

$$Z = \sqrt{(r_1 + r_2)^2 + \{k(n_1 + n_2)^2\}^2}$$

The resistance component R′ during the short-circuiting of the control coil 3 is:

$$R' = r_1 + r_2 + \left(\frac{n_1 + n_2}{n_3}\right)^2 \cdot r_3$$

The impedance variation in this case is the same as that in the usual case of use.

When a portion of the main coil 2 is short-circuited, this short-circuited main coil portion operates as a tertiary coil with respect to the non-short-circuited portion of the main coil, and it is the tertiary coil which is short-circuited. Therefore, there is little or no reactance component but a great deal of resistance component $r$, hence $$r = r_1 + \left(\frac{n_1}{n_2}\right)^2 r_2$$

When the control coil 3 is short-circuited, the control coil 3 and the short-circuited main coil portion are in parallel relationship with each other, hence $$r' = r_1 + \frac{\left(\frac{n_1}{n_2}\right)^2 \left(\frac{n_1}{n_3}\right)^2 r_2 r_3}{\left(\frac{n_1}{n_2}\right)^2 r_2 + \left(\frac{n_1}{n_3}\right)^2 r_3}$$

The voltage at which the high voltage relay B operates is constant, and therefore, if the impedance of the variable reactor A is varied, the voltage applied to the high voltage relay B is varied even when the same supply voltage is in use, and thus the high voltage relay B can operate in some cases and cannot operate in other cases. In the example shown in FIG. 24, the impedance of the reactor A is high when no short-circuiting is made, and therefore a high voltage is required in order that the high voltage relay B may have a certain voltage applied thereto. The impedance of the variable reactor A is low when short-circuiting occurs, and therefore a low supply voltage can be used in order that the high voltage relay B may have the same voltage applied thereto.

To speak conversely, a rated voltage in use can be changed over to a high or a low level by turning on or off the switch 49.

Figure 25:
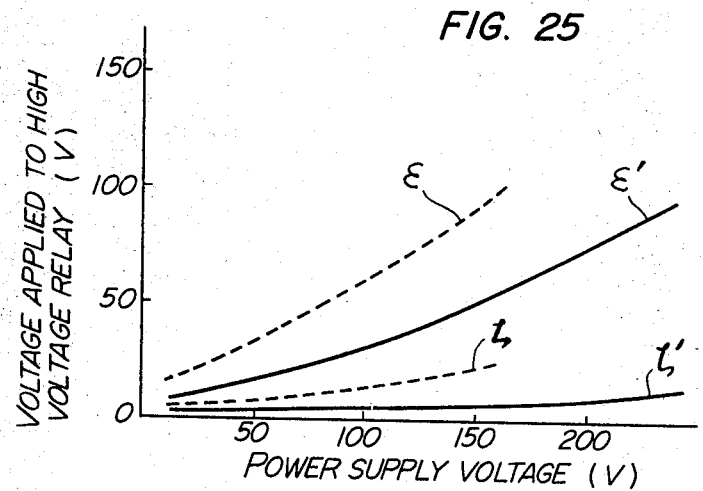
FIG. 25 is a graph illustrating the operation thereof.

FIG. 25 illustrates the operation of the apparatus shown in FIG. 24. In the graph, the dotted curves $e$ and $\zeta$ represent the characteristics when a portion of the main coil 2 of the variable reactor A is short-circuited, and the solid curves $e'$ and $\zeta'$ represent the characteristics when said portion of the main coil 2 is not short-circuited. Also, the characteristics represented by $e$ and $e'$ refer to the case where the control coil of the variable reactor A is closed, while the characteristics represented by $\zeta$ and $\zeta'$ refer to the case where said control coil is opened.

As is apparent from the graph, the rated voltage can readily be varied from 100–150 v. to 200 v. or higher by turning on or off the switch 49.

Figure 26:
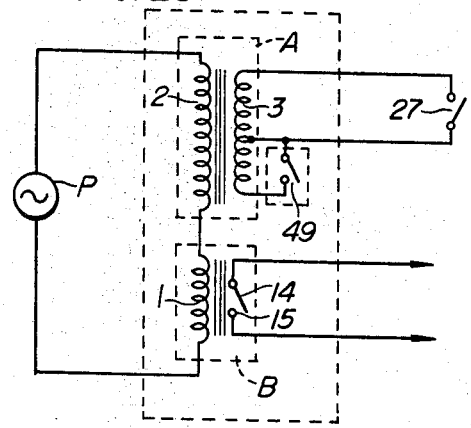
FIGS. 26 and 27 are block diagrams of the respective electric circuits in further examples of the present invention.

FIG. 26 shows an alternative arrangement of the apparatus shown in FIG. 24, and similar parts are represented by similar reference numerals.

This alternative arrangement differs from that of FIG. 24 in that the short-circuiting switch 49 is provided in the control coil of the variable reactor A, but such arrangement also results in the same effect as that of FIG. 24.

In each of the above-described examples, the tap which is short-circuited numbers only one, whereas it is also possible to provide a plurality of such taps, which are successively short-circuiting to thereby further increase the number of rated voltages available for use.

As described above, the switch employed as means for changing over the rated voltage is of the type which opens and closes instead of the type which has a change-over action, and this leads to a more simplified construction and wiring as well as a smaller size and a low cost, than the case where a change-over switch is employed.

Figure 27:
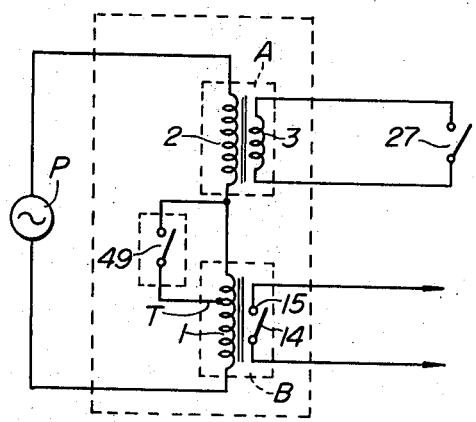

FIG. 27 shows still another example, wherein the parts similar in operation to those in FIG. 24 are indicated by similar numerals.

The exciting coil 1 is provided with a tap T, and the tap and switch 49 are adapted to short-circuit a portion of the exciting coil 1.

Figure 28A:
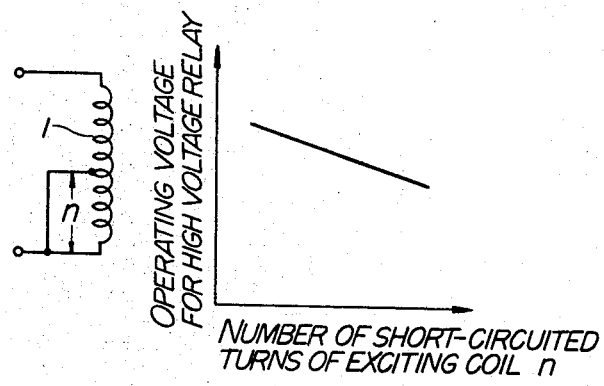
FIG. 28 illustrates the relation between the operating voltage of the high voltage relay as shown in FIG. 27 and the number of short-circuited turns of the exciting coil thereof.
Figure 28B:
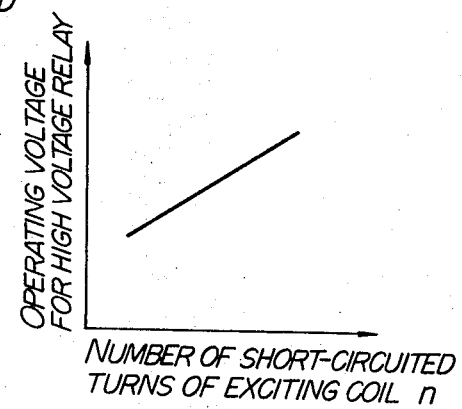

FIGS. 28a and 28b illustrate the relation between the number of turns of the short-circuited exciting coil and the operating voltage of the high voltage relay (i.e. the voltage at which the relay attracts the armature). When a portion of the coil in the supply voltage terminal is short-circuited, the operating voltage of the high voltage relay is lowered as the number of short-circuited turns is increased, as shown in FIG. 28a. When a portion of the coil outside the supply voltage terminal is short-circuited, the operating voltage of the high voltage relay is conversely raised as the number of short-circuited turns is increased, as shown in FIG. 28b.

In this way the operating voltage of the high voltage relay can be varied by short-circuiting a portion of the exciting coil, and consequently, if the relay is combined with the reactor A, it is still possible to vary the voltage range in which the overall apparatus can operate. That is, the rated voltage can be varied.

In this specific example only one tap T is employed, whereas a desired number of such taps can also be used so as to be successively short-circuited. If a fine adjustment of the operating voltage is desired, it is possible to insert a variable resistor in the short-circuiting circuit and adjust the resistor for the purpose.

As seen from the foregoing, this arrangement is such that a portion of the exciting coil is short-circuited to change over the rated voltage available for use, and therefore the switch in use is of the change-over type which permits a simplified and trouble-free construction, as well as a small size and low cost, of the switch. Furthermore, such switch facilitates the wiring work and is easy to manufacture.

In addition, this arrangement can very finely vary the operating voltage of the high voltage relay, and when a supply voltage such as 100 v. is raised to 110 v., 115 v. or the like, it is particularly effective, decreasing the irregularity of performance to a great extent.

Also, the exciting coil has only two terminals led out, which makes the tapping much easier than in the case where the variable reactor is provided with means for changing over the rated voltage. Moreover, a greater space can be provided from the control coil of the variable reactor, whereby a higher degree of insulation is ensured.

FIGS. 29 to 32 show three alternative arrangements in which the alternating current electromagnetic apparatus of FIGS. 1 to 7 is further provided with means for changing over the rated voltage available for use in the apparatus. The basic operation as alternating current electromagnetic apparatus is identical with that shown in FIGS. 1 to 7, and therefore similar parts are indicated by similar numerals. Description will therefore be focused on the differences therebetween.

Figure 29:
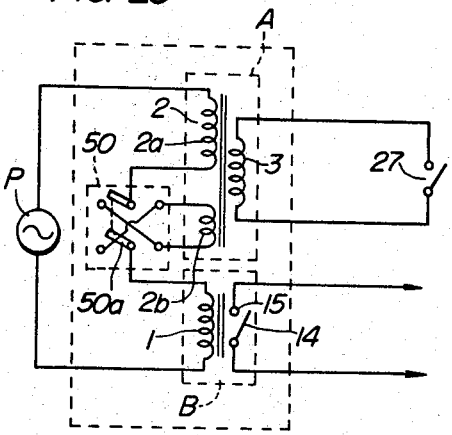
FIG. 29 shows the electric circuit in yet another example of the present invention.

In the example shown in FIG. 29, the main coil 2 of the variable reactor A comprises a coil 2a and a coil 2b. A switch 50 is provided to make the direction of the turn of the coil 2b into the forward direction the backward direction with respect to that of the coil 2a, thereby changing over the serial connection of the coil 2b with respect to the coil 2a.

In FIG. 29, if the movable member 50a of the switch 50 is thrown to the right, the coil 2b will be connected with respect to the coil 2a so that the magnetic fluxes add to each other (hereinafter referred to as "in the forward direction"), and this is suited for use with a high voltage. If the movable member 50a is thrown to the left, the coil 2b will be connected with respect to the coil 2a so that the magnetic fluxes negate each other (hereinafter referred to as "in the backward direction"), and this is suited for use with a low voltage. Assuming in FIG. 29 that the number of turns is $n_1$ for coil 2a, $n_2$ for coil 2b and $n_3$ for control coil 3, and that the resistances of the respective coils are $r_1$, $r_2$ and $r_3$, and if the control coil 3 is opened when the connection of the coil 2b with respect to the coil 2a is in the forward direction, then the reactance component L of the variable reactor A becomes:

$$L = K(n_1 + n_2)^2$$

where K is a proportional constant.

If the control coil 3 is short-circuited, there will be only the resistance component, which is:

$$R = (r_1 + r_2) + \left(\frac{n_1 + n_2}{n_3}\right)^2 r_3$$

If the control coil 3 is opened when the connection of the coil 2b with respect to the coil 2a is in the backward direction, the reactance component L' of the variable reactor A will become:

$$L' = k(n_1 - n_2)^2$$

If the control coil 3 is short-circuited, the resistance component R' will be:

$$R' = (r_1 + r_2) + \left(\frac{n_1 - n_2}{n_3}\right)^2 r_3$$

In this embodiment, experiments were carried out with $n_1 = 5100$, $n_2 = 1300$ and $n_3 = 600$, where the observations of L, L', R and R' were as follows:

$$L = 110{,}000 \Omega, \quad R = 7{,}200 \Omega$$

$$L' = 5{,}400 \Omega, \quad R' = 2{,}900 \Omega$$

As seen, the values of L' and R' are less than about half those of L and R. Therefore, if the rated voltage is 200 v. when the coil 2b is connected in the forward direction, there can be obtained a rated voltage of 100 v. if the coil 2b is connected in the backward direction. Accordingly, even if the supply voltage is varied, the voltage of the high voltage relay B is substantially unchanged because of the changed-over connection of the coil 2b by means of the switch 50.

Figure 30:
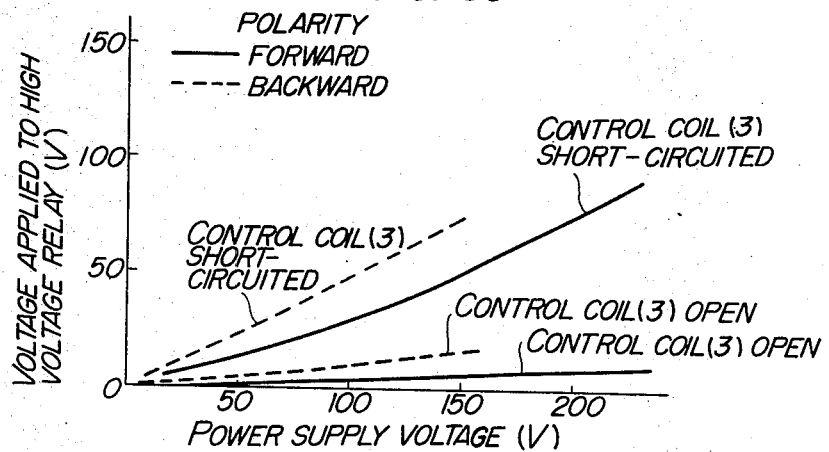
FIG. 30 is a graph illustrating the variation in the voltage applied to the high voltage relay with respect to the variation in the supply volage in the apparatus of FIG. 29.

FIG. 30 illustrates how the voltage applied to the high voltage relay B is varied with respect to the supply voltage. It is seen from this graph that the change in the polarity of the coil accompanies a substantial change in the supply voltage intended to apply the same relay voltage.

Figure 31:
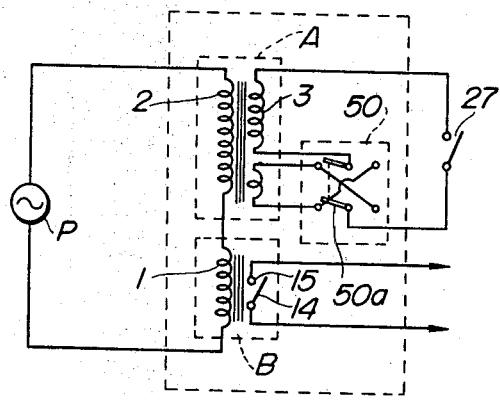
FIGS. 31 and 32 are block diagrams of the respective electric circuits in still further examples of an alternating circuit electromagnetic apparatus according to the present invention.

FIG. 31 shows a further example of the arrangement shown in FIG. 29. In this example, the means for changing over the rated voltage as shown in FIG. 29 is provided in the control coil 3 of the variable reactor A. In this case, if the movable member 50a of the switch 50 is thrown to the left so as to make the connection in the forward direction, it will provide use for a low voltage, whereas if the movable 50a is thrown to the right so as to make the connection in the backward direction, it will provide use for a high voltage. However, when the control coil 3 is opened by the switch 27, the voltage applied to the high voltage relay B is constant independent of the direction of the connection.

As has been discussed, the means for changing over the rated voltage available for use with the electromagnetic apparatus is provided by forming at least one of the main coil 2 and control coil 3 of the variable reactor with a plurality of coils, said plurality of coils having the polarities thereof with respect to each other changed over by the switch. Thus all the coils are always used in effect, which means that none of the coils is left idle or short-circuited. Therefore the temperature rise is uniform, and no local heating is created. Moreover, the entire apparatus can be small in size.

A further advantage of this arrangement is that the use of a plurality of divided coils provides a lower proportion of defective ones than in the case where the tap is led out of the coil to effect the change-over, and that it is easier to repair.

Figure 32:
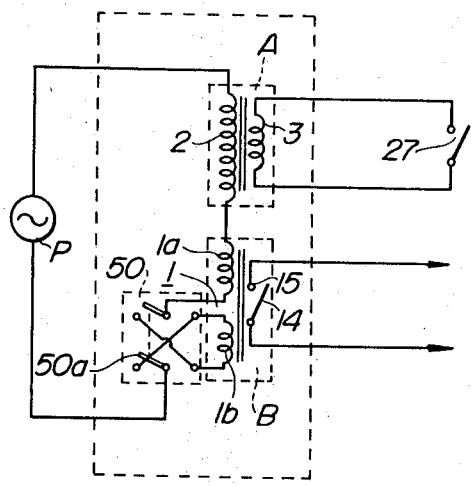

Referring to FIG. 32, the exciting coil 1 of the high voltage relay B is divided into two coils such as coils 1a and 1b, and the coil 1b is adapted to be connected so that its polarity or direction of turn is changed over to the forward or backward direction with respect to the coil 1a by the switch 50. The coils 1a and 1b are connected in series with each other so that when the movable member 50a of the switch 50 is thrown to the right, it provides positive polarity, and that when the movable member 50a is thrown to the left, it provides the opposite polarity. The change in the state of connection varies the operating voltage of the high voltage relay B.

Empirically, if the coils 1a and 1b of the high voltage relay B, which operated at 35 v. when the coil 1a only was in use and operated at 29 v. when the coil 1b alone was in use, were connected so as to provide positive polarity, then the high voltage relay B attracted the armature at 48 v. When the coils 1a and 1b are connected so as to provide the opposite polarity, the high voltage relay B operated at 56 v.

Usually, the operating voltage is lowered as the number of turns of the relay coil is decreased. However, when the opposite polarity is provided, the equivalent number of turns is decreased while the resistance values function in the form of a sum, and therefore the operating voltage is increased.

The fact that the operating voltage of the high voltage relay itself is varied in this way means that the high voltage relay, when combined with the variable reactor, would not operate unless the entire voltage to be applied (i.e. the supply voltage) is also varied. To speak conversely, the high voltage relay would not operate unless the supply voltage is varied in accordance with the positive or opposite polarity provided by the connection of the coils 1a and 1b. This is why the rated voltage is changed over.

While the exciting coil 1 has been shown as comprising two coils in the above example, it is also possible that the exciting coil 1 comprises more than two coils, of which the polarities can be changed over in various combinations so as to change over the rated voltage variously.

In this example, the means for changing over the rated voltage is provided by the exciting coil which comprises a plurality of coils, said plurality of coils having their polarities changed over with respect to each other. Such arrangement ensures the effective use of the exciting coil without any local short-circuiting or opening, and consequently it is free from any local heating. The entire apparatus can be miniaturized. Moreover, a greater space which can be provided from the control coil 3 of the variable reactor serves to provide a higher dielectric strength which means great ease in insulation. Additionally, the variation in the operating voltage of the high voltage relay due to the change-over of the rated voltage can be relatively small, and this makes the apparatus particularly effective when it is desired to raise the supply voltage from 100 v. to 110 v. or 115 v.

FIGS. 33 to 36 show three alternative examples in which the alternating current electromagnetic apparatus as described with reference to FIGS. 1 to 7 is additionally provided with means for changing over the rated voltage available for use with the apparatus. The basic operation as alternating current electromagnetic apparatus is identical with that shown in FIGS. 1 to 7, and therefore like parts are represented by like numerals. Description will only be made of the distinctions therebetween.

Figure 33:
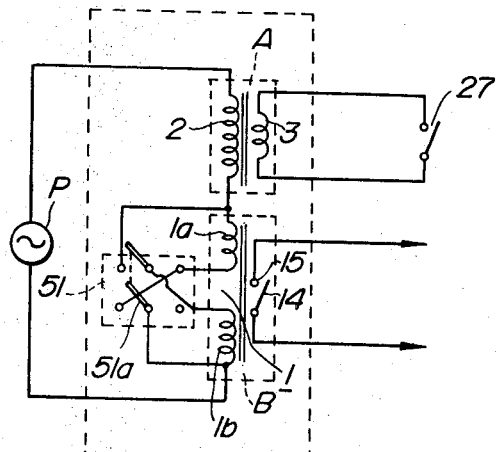
FIGS. 33 and 34 are similar views of the respective electric circuits showing further embodiments of the present invention.

Referring to FIG. 33, the exciting coil 1 of the high voltage relay B comprises two coils 1a and 1b, which are adapted to be connected in series or parallel by a switch 51. If the movable members 51a of the switch 51 is thrown to the right, the coils 1a and 1b are connected in series, and if the movable member 51a is thrown to the left, the connection of the two coils will be parallel. When the connection of the coils 1a and 1b is a parallel one, the supply ampere turn at the same voltage is increased, and when the connection is a series one, the supply ampere turn is decreased. Thus, the rated voltage can be changed over.

Here is an example in which the invention was carried out. The voltage at which the high voltage relay B comprising two coils each having 4000 turns attracts the armature is varied as follows:

When only coil having 4000 turns is in use—35 v.
When two coils each having 4000 turns are connected in parallel—28 v.
When two coils each having 4000 turns are connected in series—60 v.

As a result of the fact the operating voltage of the high voltage relay B is varied, the operating voltage of the overall apparatus is also varied. Consequently, the rated voltage of the entire apparatus can be varied by changing over the connection of the exciting coils into serial or parallel connection.

Thus, the means for changing over the rated voltage employed in this arrangement is the exciting coil 1 which comprises a plurality of coils, which are connected in series or parallel by a switch. Therefore, the degree in which the rated voltage is varied can be great, and consequently this arrangement is very convenient to use either when the supply voltage of 100 v. is raised to a double or higher level such as 220 v. or 240 v., or in the reverse case. Also, all the coils function effectively all the time, without any coil having an idle or short-circulated portion, which means no local exothermic, and the entire apparatus can be small in size. Further, since a greater space can be provided between the means for changing over the rated voltage and the control coil of the variable reactor, it is possible to provide a greater dielectric strength which leads to easy insulation.

Figure 34:
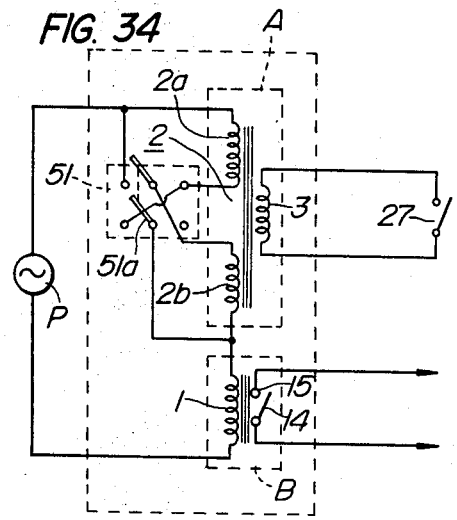

In the arrangement as shown in FIG. 34, the main coil 2 of the variable reactor A comprises coils 2a and 2b, which are adapted to be connected in series or parallel by a change-over switch 51. When the movable member 51a of the switch 51 is thrown to the right, the coils 2a and 2b of the main coil 2 are brought into series connection so as to be suitable for a high voltage, and when the movable member 15a is thrown to the left, the two coils 2a and 2b are brought into parallel connection which is suitable for a low voltage.

Assuming that the number of turns is equal between the coils 2a and 2b, and if the movable member 51a of the switch 51 is thrown to the right for series connection, the reactance component when the control coil 3 of the variable reactor A is opened will be about eight times greater than if the movable member 51a is thrown to the left for parallel connection. Also, the resistance component when the control coil 3 is short-circuited will be about four times greater in the former case than in the latter.

This fact means that the arrangement can be used even when the rated voltage is raised fourfold.

Figure 35:
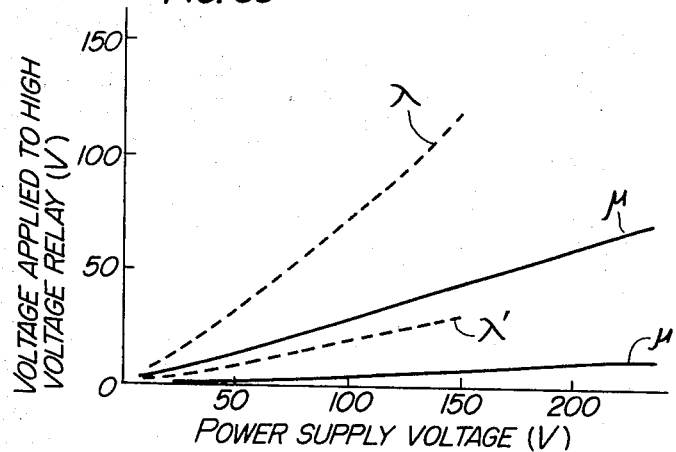
FIG. 35 is a graph showing the variation in the voltage applied to the high voltage relay when the main coil of the variable reactor is changed over into series or parallel connection and the control coil thereof is short-circuited and opened.

FIG. 35 illustrates how the voltage applied to the high voltage relay B is varied by the series or parallel connection of the coils 2a and 2b of the main coil 2 and by the control coil 3 being short-circuited or opened. In the graph, the dotted curves λ and λ' refer to the characteristics in the case where the coils 2a and 2b are in parallel connection, and the solid curves μ and μ' refer to the characteristics in the case where said two coils are in series connection. Also, the characteristics represented by λ and μ refer to the case where the control coil 3 of the variable reactor A is closed, and the characteristics represented by λ' and μ' refer to the case where the control coil 3 is opened. It is seen from the graph that in the case of parallel connection the voltage applied to the high voltage relay B is the same even if the supply voltage is much lower than in the case of series connection, and that simultaneously the voltage applied to the high voltage relay B is widely varied by the opening or closing of the control coil 3.

Figure 36:
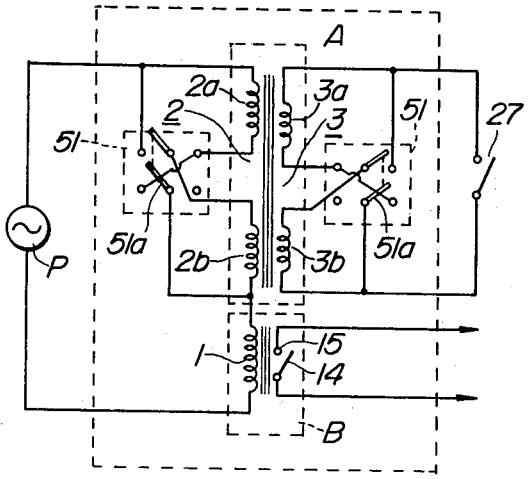
FIG. 36 is a block diagram of the electric circuit in still another example of an apparatus according to the present invention.

FIG. 36 shows another alternative of the arrangement as shown in FIG. 34, and it is seen that the control coil 3 of the variable reactor A comprises two coils 3a and 3b similar to the main coil 2, said two coils being adapted to be interchangeably connected in series or parallel relation by the change-over switch 51.

The throwing of the movable member 51a of the switch to the right causes the coils 2a and 2b of the main coil 2 of the variable reactor A to be connected in series, and the throwing of the movable member 51a to the left causes said coils 2a and 2b to be connected parallel. Also, the throwing of the movable member 51a of the switch 51 to the right causes the coils 3a and 3b of the control coil 3 to be connected in parallel, and the throwing of the movable member 51a to the left causes the coils 3a and 3b to be connected in series. In this example, four rated voltages can be selected by selecting the manners of connection for each of the main coil 2 side and the control coil 3 side. However, it is effectless to change over only the control coil 3 of the variable reactor A into series or parallel connection, because, if the control coil 3 is opened, the reactance component of the variable reactor A is the same whether the connection is in series or parallel, and the equivalent resistance as viewed from the main coil 2 side is the same even if the control coil 3 is short-circuited.

As described above, the means for changing over the rated voltage includes the main coil and the control coil of the variable reactor, each of said coils being divided into a plurality of coils, which are adapted to be connected in series or parallel by the change-over switch. Therefore, all the coils are working all the time without any coil left idle or short-circuited, and this makes the temperature rise uniform without any local temperature rise. The entire apparatus can also be made small in size.

FIGS. 37 to 41 show four embodiments of the present invention in which the alternating current electromagnetic apparatus has an integral combination of a magnetic circuit of low magnetic resistance and a magnetic circuit of high magnetic resistance including an armature.

Figure 37:
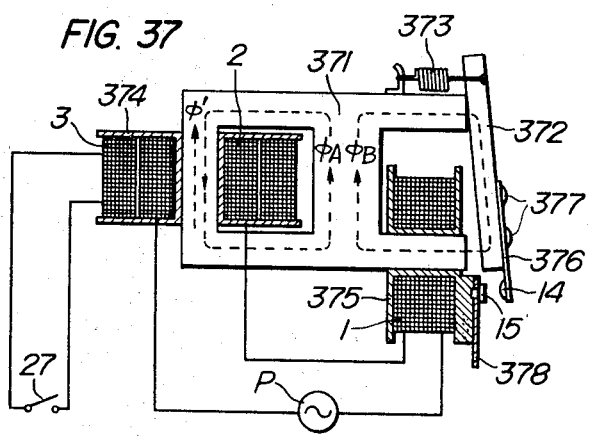

One of the embodiments will be described with reference to FIG. 37. The numeral 371 represents a fixed iron core, 372 an armature fixed to the opening end of said fixed iron core 371 by means of a spring 373, and 374 a coil bobbin fixed to said fixed iron core 371. On the coil bobbin 374 there is wound a high voltage main coil 2 forming a variable reactor, and externally of said main coil 2 there is wound a control coil 3, which is adapted to be opened and short-circuited by an operating switch 27. Another coil bobbin 375 is fixed to the opening end of the fixed iron core 371, and said coil bobbin 375 has an exciting coil 1 wound thereon. The exciting coil 1 is connected in series with said main coil 2, and these two coils 1 and 2 are connected with an alternating current power supply source P. A plate spring 376 is secured to the armature 372 at the fore end thereof by means of fastener means 377. A movable contact 14 is fixed to the inner surface of the fore end of said plate spring 376, and a fixed contact 15 is provided in opposed relationship with said movable contact 14. Said fixed contact 15 is fixed to said coil bobbin 375 through a terminal plate 378. Said exciting coil 1 and said contacts 14 and 15 together form a high voltage relay.

In operation, the operating switch 27 is first opened. Since only the exciting coil 1 and the main coil 2 are connected in series in the electromagnetic apparatus, the current passing through the circuit is a micro-current which corresponds to an exciting current. Therefore, the main coil 2 is excited to thereby create a magnetic flux $\phi_A$ which in turn causes the exciting coil 1 to be excited to thereby create a magnetic flux $\phi_B$. In this state, however, the reactance of the main coil 2 is greater than that of the exciting coil 1, and therefore the voltage the exciting coil 1 bears is low. Consequently the magnetic flux $\phi_B$ is also small. Thus, the armature 372 is not attracted by the fixed iron core 371.

At this point, when the operating switch 27 is short-circuited, a voltage induced in the main coil 2 causes a current to pass through the control coil 3, whereby there is produced in the control coil 3 a magnetic flux $\phi'$ which is directed to negate the magnetic flux $\phi_A$ produced by the main coil 2. Consequently the reactance of the main coil 2 has been reduced, and the current passing through the main coil 2 and the exciting coil 1 is increased. Because of the variation in the voltage borne by the two coils 1 and 2 which is caused by the variation in the reactance, the exciting coil 1 has applied thereto a higher voltage than when the operating switch 27 was opened, and as a result the magnetic flux $\phi_B$ increased so as to attract the armature 372 which in turn causes the movable contact 14 to be engaged with the fixed contact 15. That is, the opening or closing of the operating switch 27 causes the armature 372 to be attracted or released, so that the load connected in between the fixed contact 15 and the movable contact 14, for example, an electric motor can be controlled. In the above example, description has been made of the arrangement being such that the operating switch 27 is opened or closed so as to open or short-circuit the control coil 3, whereas it is possible to arrange so that a variable resistor (variable impedance element) is connected across the control coil 3 to vary the resistance value thereof so as to control the armature 372. The operating characteristics in the latter case is shown in FIG. 38, which illustrates the manner in which the equivalent impedance of the main coil 2 is varied by the resistor connected across the control coil 3. In the graph the horizontal solid lines represent the impedance of the main coil during the opening operation of the high voltage relay contacts 14 and 15 and the impedance of the main coil during the closing operation of the high voltage relay contacts 14 and 15, respectively. As said resistor element, use may be made of a thermosensitive resistor element, a humidity-sensitive resistor element, a magnetic resistor element or the like.

In the above shown example of the electromagnetic apparatus according to the present invention, the operating switch 27 is independent of the alternating current power source, and therefore, by suitably designing the turn of the control coil 3, the voltage applied to the operating switch 27 can be readily lowered to a level which does not cause any electric shock. For example, in an electric cleaner using such apparatus, there is no such possibility of electric shock as existed when using the conventional high voltage relay. Also, the absence of a relay controlling the high voltage switch in the operating switch circuit reduces accidents due to confused contacts. Thus, if the insulation between the main coil 2 and the control coil 3 is only taken into consideration, there is no possibility of a high voltage being applied to the operating switch circuit, which means very high safety against electric shocks. In addition, the fact that the exciting coil 1 of the high voltage relay is connected in series with the main coil 2 of the variable reactor to thereby operate the high voltage relay permits the number of supply turns to be numerous, and consequently ensures the operation to be stable. Moreover, the design can be made such that the current flowing through the control coil 3 is small, and this permits use of a small-diameter wire for the control coil, which in turn leads to the miniaturization of the apparatus.

Reference is now made to another example as shown in FIG. 39, in which the numeral 391 denotes a fixed iron core, and the numeral 392 indicates an armature fixed to the opening end of said fixed iron core 391 through a spring 393, by means of which the armature 392 is energized to be spaced apart from the fixed iron core 391. The numeral 394 represents a coil bobbin fixed to said fixed iron core 391, and around the coil bobbin 394 there is wound a high voltage main coil 2 forming a variable reactor. A control coil 3 is also wound outwardly of said main coil 2. The control coil 3 is adapted to be opened and short-circuited by an operating switch 27. The numeral 395 indicates another coil bobbin also fixed to the fixed iron core 391. An exciting coil 1 is wound on said other coil bobbin 395, and it is connected in series with the main coil 2. Said two coils 1 and 2 are connected with an alternating current supply P. The turns of these coils 1 and 2 are directed in such direction that the magnetic fluxes produced by the excitation of these coils respectively add to each other. A plate spring 396 is fixed to the fore end of the armature 392 by means of fastener means 397, said plate spring having a movable contact 14 fixed thereto in the inner surface at the fore end thereof. A fixed contact 15 is provided in opposed relationship with said movable contact 14, and this fixed contact 15 is secured to the fixed iron core 391 by means of terminal plate 398 and spacer 399. The exciting coil 1 and the contacts 14 and 15 together constitute a high voltage relay.

The operation of the electromagnetic apparatus according to this embodiment will now be described.

First, when the operating switch 27 is opened, the main coil 2 is excited thereby producing a magnetic flux $\phi_A$, which in turn excites the exciting coil 1 to thereby produce a magnetic flux $\phi_B$. This means that the magnetic flux $\phi_A$ produced by the main coil and the magnetic flux $\phi_A$ produced by the main coil and the magnetic flux $\phi_B$ produced by the exciting coil add to each other. Also, the magnetic circuit through which the magnetic flux $\phi_B'$ passes includes a clearance between the armature 392 and the fixed iron core 391, and therefore the magnetic resistance therein is so great that the magnetic flux $\phi_B'$ is much smaller than the magnetic flux $\phi_B$. Consequently, the armature 392 is not attracted and the movable contact 14 and fixed contact 15 remain open.

Next, when the operating switch 27 is closed, a current due to the voltage induced by the magnetic fluxes $\phi_A$ and $\phi_B$ flows through the control coil 3, whereby the control coil 3 is excited to produce a magnetic flux $\phi'$ directed so as to negate the magnetic fluxes $\phi_A$ and $\phi_B$. As a result, the magnetic resistance in the magnetic circuit through which the magnetic fluxes $\phi_A$ and $\phi_B$ pass is quickly increased, and the reactances of the exciting coil 1 and the main coil 2, particularly of the latter, are sharply decreased, so that the current flowing through these two coils 2 and 1 is sharply increased. In this case the rate of decrease in the reactance is greater in the main coil 2 than in the exciting coil 1, and therefore the voltage that is borne by the exciting coil 1 is greater than that when the operating switch 27 is opened. In this way the magnetomotive force provided by the exciting coil 1 is increased, but this increased magnetic flux passes through the magnetic circuit through which the magnetic flux $\phi_B'$ since the magnetic circuit through which the magnetic fluxes $\phi_A$ and $\phi_B$ pass has now a higher magnetic resistance. Thus, the magnetic flux $\phi_B'$ is increased. Consequently, the armature 392 is attracted by the fixed iron core 391 and thereby the movable contact 14 and fixed contact 15 are closed together. Thus, by the operation of the operating switch 27, the movable contact 14 and the fixed contact 15 can be opened or closed. In this example the arrangement is such that the opening or closing of the operating switch 27 causes the control coil 3 to be opened or short-circuited and the armature 392 to be operated, whereas it is also possible to connect a variable resistor (variable impedance element) across the control coil 3 and vary the resistance value thereof so as to control the armature 392. The operation characteristics in this case are as shown in FIG. 38, wherein the horizontal dotted lines represent the impedance of the main coil when the contacts 14 and 15 of the high voltage relay are in the opening operation and that when said two contacts are in the closing operation, respectively.

In the above described electromagnetic apparatus embodying the present invention, it is also possible to select a suitable number of turns of the control coil 3 with respect to those of the main coil 2 and the exciting coil 1 and thereby to make the induced electromotive force of a low voltage, which would not cause any serious electric shock even if the operating switch 27 should be touched by mistake. This means that, in an electric cleaner or the like employing such operating switch provided in the hose, it is possible to make such a design that the connecting terminals that would be exposed on the cleaner body side when the hose has been removed from the cleaner body can be of a low voltage, and thus there is little or no danger of electric shock. Also, as a result of the integral and magnetic combination of the main coil 2 and exciting coil 1, there is provided a great magnetic flux which interlinks the control coil 3, and therefore the control coil 3 can achieve its intended purpose even if it has only a small number of turns, which leads to the small size, light weight and economy of the entire apparatus. In addition, high reliability in operation is ensured by the fact that the magnetic flux produced by the excitation of the exciting coil 1 has no attracting force since this magnetic flux substantially does not pass through the magnetic circuit including the armature 392 when the operating switch 27 is opened. In the conventional apparatus which is arranged such that the magnetic flux produced by the excitation of the exciting coil passes only through the magnetic circuit of high magnetic resistance including the armature, there is often caused such a maloperation in which the armature is attracted when the operating switch is left in the open state to permit the voltage to rise. Such unfavorable possibility is completely eliminated in the shown electromagnetic apparatus according to the present invention, and therefore it is possible to expand the operating voltage range of exciting coil which drives the armature.

Reference will now be made to the embodiment as shown in FIG. 40, wherein the numeral 401 denotes an apertured, rectangular fixed iron core, and the numeral 404 indicates a coil bobbin fixed to said fixed iron core 401. Said coil bobbin 404 has a main coil 2 wound thereon, and a control coil 3 is wound outwardly of said main coil 2. The control coil 3 is adapted to be opened or closed by an operating switch 27. The numeral 405 represents another coil bobbin also fixed to the fixed iron core 401, and an exciting coil 1 is wound on said other coil bobbin 405. Said exciting coil 1 is connected in series with said main coil 2 and with an alternating current supply source P. The numerals 401' and 401" represent projections projected opposedly and inwardly from the fixed iron core 401 intermediate between said coil bobbins 404 and 405. Between said projections 401' and 402" there is provided an armature 402 having one end thereof fixed to the projection 401' by means of a plate spring 403. This plate spring 403 serves to force the fore end of the armature away from the projection 401". The numeral 406 indicates a contact plate spring fixed to said armature 402, and it has a movable contact 14 provided in the inner surface thereof. A fixed contact 15 is provided in opposed relationship with said movable contact 14 and it is secured to the projection 401" by means of mounting plate 407. Between said movable contact 14 and said fixed contact 15 there is connected a load such as an electric motor or the like. The exciting coil 1 and the contacts 14 and 15 form a high voltage relay.

The operation of the electromagnetic apparatus as shown in this example will be described.

Suppose that, under the state where the main coil 2 and the exciting coil 1 are connected with the alternating current power source P, the operating switch connected with the control coil 3 is open. In such a state the magnetic fluxes produced by the excitation of the main coil 2 and exciting coil 1 add to each other to form a magnetic flux $\phi_A$ passing through the magnetic circuit A. On the other hand, the magnetic flux $\phi_B$ passing through the armature 402 is substantially zero since the magnetic flux produced by the excitation of the exciting coil 1 and the magnetic flux produced by the excitation of the main coil 2 are in opposite direction to each other and therefore they negate each other.

Subsequently, when the operating switch 27 is closed, a current flows through the control coil 3 due to the voltage produced by the interlinkage of the magnetic flux $\phi_A$, whereby there is produced in the control coil 3 a magnetic flux $\phi'$ having the opposite direction to the magnetic flux $\phi_A$. Said magnetic flux $\phi'$ causes the magnetic resistance of the magnetic circuit A to be increased, and therefore the magnetic flux produced by the excitation of the exciting coil 1 is more than that produced by the excitation of the main coil 2. Thus, the former flux produced by the exciting coil 1 passes through the magnetic circuit including the armature 402. What is more important in this state is that the increased magnetic resistance of the magnetic circuit A causes the reactance of the main coil 2 to be sharply decreased, which in turn causes the current to be increased and consequently the magnetomotive force of the exciting coil 1 to be enhanced. In such case there also occurs a decrease in the reactance of the exciting coil 1, but since the rate of this decrease is lower than the rate of decrease in the reactance of the main coil 2, the voltage share between the main coil 2 and the exciting coil 1 shifts substantially toward the latter, whereby the voltage share of the exciting coil 1 is sharply increased. Consequently the magnetic flux $\phi_B$ produced by the exciting coil 1 flows through the magnetic circuit B rather than the magnetic circuit A, as referred to above, and thus the armature 402 is attracted to close the movable contact 14 with respect to the fixed contact 15.

In the above example the control coil 3 is opened or short-circuited by the operating switch 27 to operate the armature 402, whereas it is possible, as described with reference to FIG. 39 embodiment, to connect a variable resistor (variable impedance element) across said control coil 3 and vary the resistance value thereof so as to control the armature 402.

It is also possible in this arrangement to control the armature 402 by means of the operating switch 27 provided in the control coil 3 side of low voltage and control the opening and closing of the contacts 14 and 15 of the high voltage relay. Therefore no great accident of electric shock can take place even if the operating switch is touched by mistake. Also, according to such electromagnetic apparatus, the magnetic flux produced by the excitation of the exciting coil 1 and the magnetic flux produced by the excitation of the main coil flow through the same magnetic circuit of low magnetic resistance when the operating switch 27 is opened, and therefore, even if the voltage of the alternating current power source P is raised, the armature never operates unless the open operating switch 27 is closed. This means that there is no possibility of maloperation. Further, the operation of the armature 402 is very stable because the voltage share of the exciting coil 1 can be increased by closing the operating switch 27 so as to vary the reactance of the main coil 2, and additionally because the magnetic flux produced by the excitation of the exciting coil 1 can be concentrated to the magnetic circuit including the armature 402 by increasing the magnetic resistance of the magnetic circuit common to the exciting coil 1 and the main coil 2. Still further, the armature 402 is controlled by the magnetic flux of the main coil 2 excited direct by the alternating current power source P, so that there is obtained a great force which makes the electromagnetic apparatus easier to design.

Figure 41:
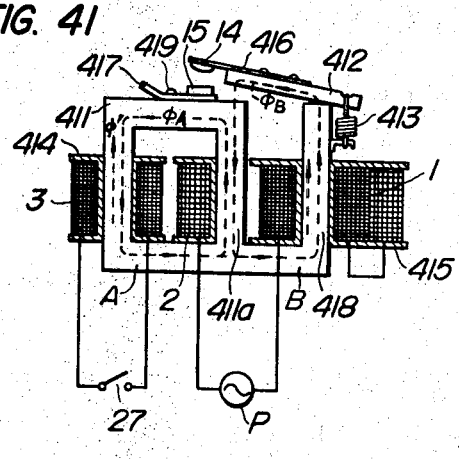

Discussion will now be made of still another embodiment as shown in FIG. 41, in which the numeral 411 indicates a fixed iron core, and 414 indicates a coil bobbin fixed to said fixed iron core 411. The coil bobbin 414 has a control coil 3 wound thereon, said control coil 3 being adapted to be opened or short-circuited by an operating switch 27. The numeral 418 denotes a relay iron core portion forming a portion of said fixed iron core 411, and the numeral 415 denotes a coil bobbin fixed to said relay iron core portion 418. The coil bobbin 415 has an exciting coil 1 wound thereon, and outwardly of said exciting coil 1 there is provided a main coil 2 which is wound in the rectangular aperture of the fixed iron core 411 and is connected in series with the exciting coil 1. Said two coils 1 and 2 are connected with an alternating current power source P. The numeral 412 represents an armature mounted on the fore end portion of said relay iron core portion 418 by means of a spring 413, by which the end of the armature 412 is forced away from the fixed iron core 411. The numeral 416 represents a plate spring fixed to the armature 412, and the spring 416 has a movable contact 14 secured to the inner surface at the end thereof. A fixed contact 15 is provided in opposed relationship with said movable contact 14 and it is secured to the fixed iron core 411 by means of a pin 419. The exciting coil 1 and the contacts 14 and 15 constitute a high voltage relay.

The operation of the electromagnetic apparatus according to this embodiment will be described.

In the state where the alternating current power source P is connected across the series connection of the main coil 2 and the exciting coil 1, when the operating switch 27 connected with the control coil 3 is opened, the magnetic flux produced by the excitation of the exciting coil 1 becomes a magnetic flux $\phi_B$ which passes through the magnetic circuit B. On the other hand, the magnetic flux produced by the excitation of the main coil 2, when considered with respect to the magnetic circuit B, does not pass through this magnetic circuit B, since the magnetomotive force applied to the portion 411a of the fixed iron core 411 and the magnetomotive force applied to the relay iron core portion 418 negate each other. Thus, the magnetomotive force applied to the portion 411a of the fixed iron core 411 causes a magnetic flux $\phi_A$ to flow through the magnetic circuit A.

Since the main coil 2 and the exciting coil 1 are connected in series with each other, the voltage shared by each of these coils is lower than the voltage of the alternating current power source P. Further, since the magnetic resistance of the magnetic circuit A is small, the reactance of the main coil 2 is great, and since the magnetic resistance of the magnetic circuit B is great, the reactance of the exciting coil 1 is very small. Consequently, the voltage applied to the exciting coil 1 is low, and therefore the magnetic flux $\phi_B$ produced by the excitation of the exciting coil 1 is small. Thus, the armature 412 fails to be attracted by the fixed iron core 411.

Subsequently, when the operating switch 27 is closed, there flows through the control coil 3 a current due to the voltage induced by the interlinkage of the magnetic flux $\phi_A$, whereby there is produced a magnetic flux $\phi'$ directed so as to negate the magnetic flux $\phi_A$. As a result, the magnetic resistance of the magnetic circuit A is sharply increased, and this causes the reactance of the main coil 2 to be sharply decreased. On the other hand, there is no variation in the magnetic resistance of the magnetic circuit B, and therefore there is no variation in the reactance of the exciting coil 1. Consequently, the voltage shares of the exciting coil 1 and the main coil 2 are varied so as to enhance the voltage applied to the exciting coil 1, whereby the magnetic flux $\phi_B$ is increased. Therefore, the armature 412 is attracted to the fixed iron core 411 against the pressure of the spring 413 and thereby the movable contact 14 and the fixed contact 15 are closed together. Thus, by the opening or closing operation of the operating switch 27, the armature 412 and therefore the movable contact 14 and the fixed contact 15 can be controlled to be opened or closed.

While this arrangement is such that the operating switch 27 is opened or closed to thereby open or short-circuit the control coil 3 and control the armature 412, it will be appreciated that, as previously described with respect to the example shown in FIG. 39, it is possible to connect a variable resistor (variable impedance element) across the control coil 3 and vary the resistance value thereof so as to control the armature 412.

Referring to FIG. 38, the horizontal dash-and-dot lines represent the impedance of the main coil when the high voltage relay contacts 14 and 15 in this example are in the opening operation and that when said two contacts 14 and 15 are in the closing operation, respectively. It is also possible in the electromagnetic apparatus according to this embodiment to set the induced electromotive force induced by the control coil 3 at a low voltage level, through selecting a suitable number of turns of the control coil 3 with respect to the main coil 2. Thus, no danger of electric shock will occur even if the operating switch 27 should be manually touched by mistake. Since no magnetic flux flows through the magnetic circuit of high magnetic resistance including the armature 412 because of the mutual negation of the magnetic fluxes from the main coil 2, any increase in the voltage from the alternating current supply source P would not cause the armature 412, unless the operating switch 27 is operated, to control the control coil 3. This ensures reliable operation as well as a wider voltage range to be controlled. Furthermore, the separate location of the control coil 3 from the exciting coil 1 and main coil 2 located on the high voltage side prevents any high voltage from entering the control coil due to confused contacts or the like, and a high degree of safety is provided.

Figure 42:
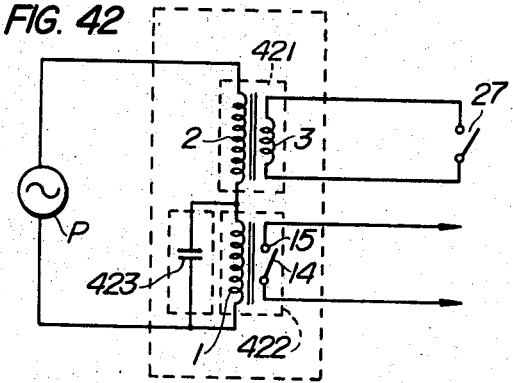
FIG. 42 is a block diagram showing an example of electric circuit adapted to enlarge the voltage range which can normally operate the alternating current electromagnetic apparatus according to the present invention.

Referring now to the circuit diagram of FIG. 42, description will be made of an arrangement effective for expanding the voltage range in which the electromagnetic apparatus of the above-disclosed type can be normally operated, that is, the supply voltage range that can be used with the said electromagnetic apparatus. The main coil 2 of the variable reactor 421 and the exciting coil 1 of the high voltage relay B are connected in series with the alternating current power supply source P. A capacitor 423 is connected parallel with the exciting coil 1. The numerals 14 and 15 represent the movable contact and fixed contact of the high voltage relay respectively. These contacts 14 and 15 are closed together or engaged with each other by the excitation of the exciting coil 1. Alternatively, these contacts 14 and 15 may be constructed so as to be opened by the excitation of the exciting coil 1. In such arrangement, when the operating switch 27 connected with the control coil 3 of the variable reactor 421 is opened, the reactance of the main coil 2 becomes so great that most of the supply voltage is applied to the main coil 2, and therefore the high voltage relay 422 is not operated. When said operating switch 27 is closed, the reactance component of the main coil 2 becomes substantially null to leave the resistance component alone, so that substantial part of the supply voltage is applied to the exciting coil 1 to thereby operate the high voltage relay 422 so as to close the contacts 14 and 15.

In this case, if the number of turns of the control coil 3 is set smaller than those of the main coil 2, it is possible to change the voltage applied to the operating switch 27 into a voltage which would not cause a human body to feel an electric shock (for example, 24 v. or lower).

Thus, the voltage range in which said electromagnetic apparatus can operate (or the usable voltage range) is determined, with respect to the lower limit, by the voltage at which the contacts 14 and 15 of the high voltage relay 422 can be closed together when the supply voltage is increased with the two ends of the control coil 3 of the variable reactor 421 being short-circuited by the operating switch 27. The upper limit of said voltage range is determined by the voltage at which the high voltage relay 422 starts to make noise to close its contacts 14 and 15 when the supply voltage is increased with the ends of the control coil 3 of the variable reactor 421 being open. Therefore the upper voltage limit may be substantially determined by the impedance of the variable reactor 421, and the lower voltage limit may be substantially determined by the resistance component of the variable reactor 421 and the impedance of the high voltage relay 422.

Figure 43:
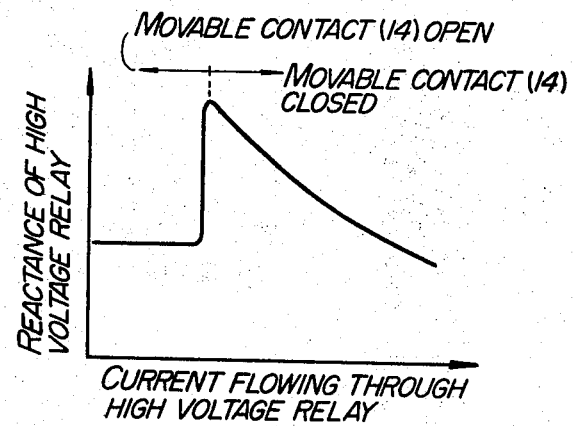
FIG. 43 is a graph representing the relation between the current passing through the high voltage relay and the reactance thereof.
Figure 44:
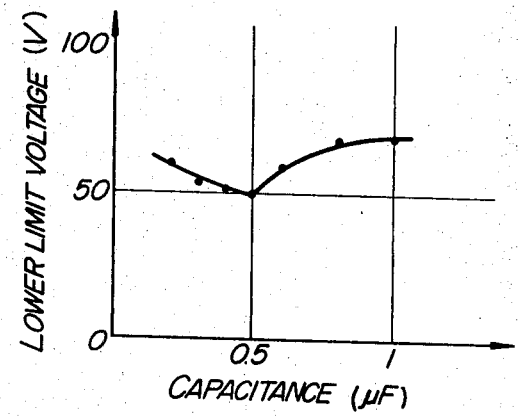
FIG. 44 is a graph showing the variation in the operating voltage range of the electromagnetic apparatus as the capacitor is connected with the exciting coil.

However, the high voltage relay 422 has its reactance widely varied between the time before the movable contact 14 thereof is attracted, the time when the contacts 14 and 15 are open, and the time after the contact 14 has been attracted (or the time when the two contacts 14 and 15 have been closed). Even after the movable contact 14 has been attracted, said reactance is reduced as magnetic saturation develops. Such state is shown in FIG. 43, wherein it is seen that the reactance of the high voltage relay 422 is great when the control coil 3 of the variable reactor 421 is short-circuited (or the contacts 14 and 15 are closed), and that said reactance is small when the control coil 3 is opened (or the contacts 14 and 15 are opened). Now, if the capacitor 423 is connected parallel with the exciting coil 1 and the capacitance thereof is selected at such a value that the capacitor produce a parallel resonance with the reactance of the high voltage relay 422 when the movable contact 14 has been attracted, then there flows a circulating current whereby it is possible to lower the lower limit voltage of the high voltage relay 422. FIG. 44 illustrates an empirical example of this, wherein the best value of the capacitance of the capacitor 423 was 0.5 μf. The procedure just described may be relied on to lower the lower limit voltage, whereas lowering of the upper limit voltage is never carried out, because no resonance is produced with the capacitor 423 when the control coil 3 is opened and the reactance of the high voltage relay 422 is small.

According to the above embodiment, it is possible to control the high voltage relay 422 at a low voltage by selecting a suitable number of turns of the control coil 3 of the variable reactor 421, which leads to the elimination of any electric shock accident. Also, the fact that the voltage applied to the operating switch 27 is a low voltage reduces the leak of current and eliminates any maloperation. Moreover, the presence of the capacitor 423 makes it possible to enlarge the voltage range available for use with the electromagnetic apparatus, or the operation range thereof, and particularly to lower the lower limit voltage, thus resulting in high stability of performance as well as in remarkably reduced irregularity of manufacture. In addition, a wider allowance is permitted with respect to the particulars of parts of high voltage relay 422 and variable reactor 421, especially with respect to the spring and dimensions of the high voltage relay, and this makes the manufacture very easy.

We claim:

1. A compact alternating current electromagnetic apparatus comprising a variable reactor having a main coil provided with a lead wire to be connected with one alternating current power line and a control coil provided with lead wires to be connected with a remote control switch, both of said coils being wound on an iron core forming a closed magetic circuit; a high voltage relay having an exciting coil provided with a lead wire to be connected with the other alternating current power line, said coil being wound on an iron core provided with an armature and forming an open magnetic circuit; said high voltage relay further comprising contact means, said means being driven by said armature and being provided with lead wires to be connected with a load circuit, the remaining lead wires of said main coil and said exciting coil being connected with each other, said variable reactor and said high voltage relay being mounted on a common insulating base plate, and being covered by a dust-proof cover; wherein said iron core of said variable reactor and said iron core of said high voltage relay are integrated into one body.

References Cited

UNITED STATES PATENTS

| | | | |
|---|---|---|---|
| 2,958,894 | 11/1960 | Carabet | 15—412 X |
| 3,458,892 | 8/1969 | Kobayashi et al. | 317—148 X |
| 3,382,374 | 5/1968 | Campbell | 307—130 |

J D MILLER, Primary Examiner

W. J. SMITH, Assistant Examiner

U.S. Cl. X.R.

307—132, 140; 335—178